United States Patent [19]
Ameen et al.

[11] Patent Number: 5,977,906
[45] Date of Patent: Nov. 2, 1999

[54] METHOD AND APPARATUS FOR CALIBRATING AZIMUTH BORESIGHT IN A RADAR SYSTEM

[75] Inventors: Yashwant K. Ameen, Poway; Patrick Anthony Ryan, Ramona, both of Calif.

[73] Assignee: Eaton Vorad Technologies, L.L.C., San Diego, Calif.

[21] Appl. No.: 09/160,517

[22] Filed: Sep. 24, 1998

[51] Int. Cl.$^6$ .................................................. G01S 7/40
[52] U.S. Cl. ........................................... 342/174; 342/165
[58] Field of Search .............................. 342/70, 165, 174, 342/368

[56] References Cited

U.S. PATENT DOCUMENTS

| | | | |
|---|---|---|---|
| 3,789,410 | 1/1974 | Smith et al. | 343/112 D |
| 4,929,952 | 5/1990 | Schneider et al. | 342/184 |
| 5,302,956 | 4/1994 | Asbury et al. | 342/70 |
| 5,402,129 | 3/1995 | Gellner et al. | 342/70 |
| 5,485,156 | 1/1996 | Mansewr et al. | 342/77 |

*Primary Examiner*—Thomas H. Tarcza
*Assistant Examiner*—Dao L. Phan
*Attorney, Agent, or Firm*—Jaquez & Associates; Martin J. Jaquez

[57] ABSTRACT

A method and apparatus for calibrating azimuth boresight in a radar system. Antenna boresight misalignment can cause radar systems to inaccurately determine the position of targets relative to a platform vehicle. These errors can be corrected by detecting and accurately measuring a boresight offset angle defined as the angle between the radar antenna boresight and the direction of travel of the host platform vehicle. Several antenna boresight calibration techniques are described. A first technique calculates the boresight offset angle by obtaining target range and azimuth angle measurements at two instants in time. The boresight offset angle is determined by the geometric relationship of the offset angle, target range and azimuth values obtained at two successive time instants. A refined approach obtains target range and azimuth values at several successive time instants, calculating interim boresight offset angles at each time instant. The boresight offset angle is computed by averaging the interim boresight offset angles. In second and third calibration techniques, the boresight offset angle is estimated from the azimuth of qualified calibration targets that are substantially aligned with the host vehicle's heading. Several restrictions are imposed upon the potential calibration targets to suppress the erroneous qualification of adjacent vehicle traffic. In accordance with one embodiment of the present invention, the calibration techniques are implemented by software instructions executed by a microprocessor within the radar system. Once the boresight offset angle is detected and calculated, it can be used to calibrate the antenna boresight using either a mathematical or physical calibration approach.

39 Claims, 8 Drawing Sheets

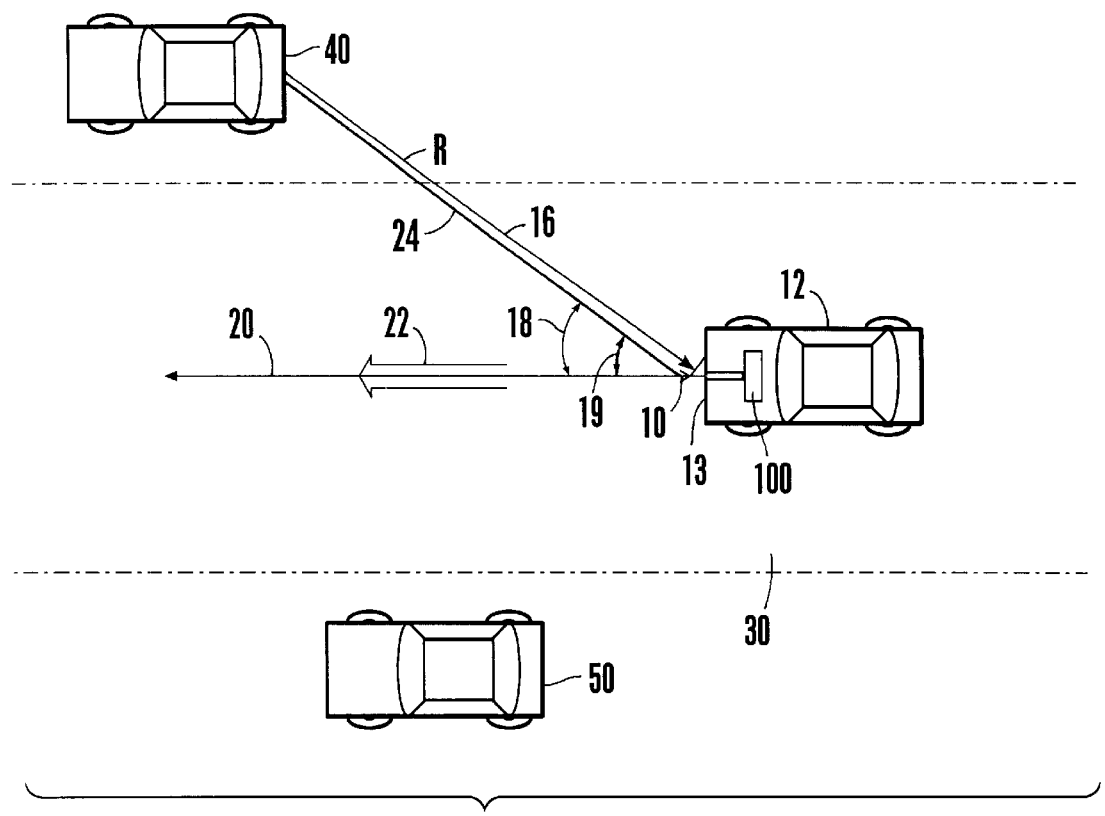
Fig. 1
Fig. 2
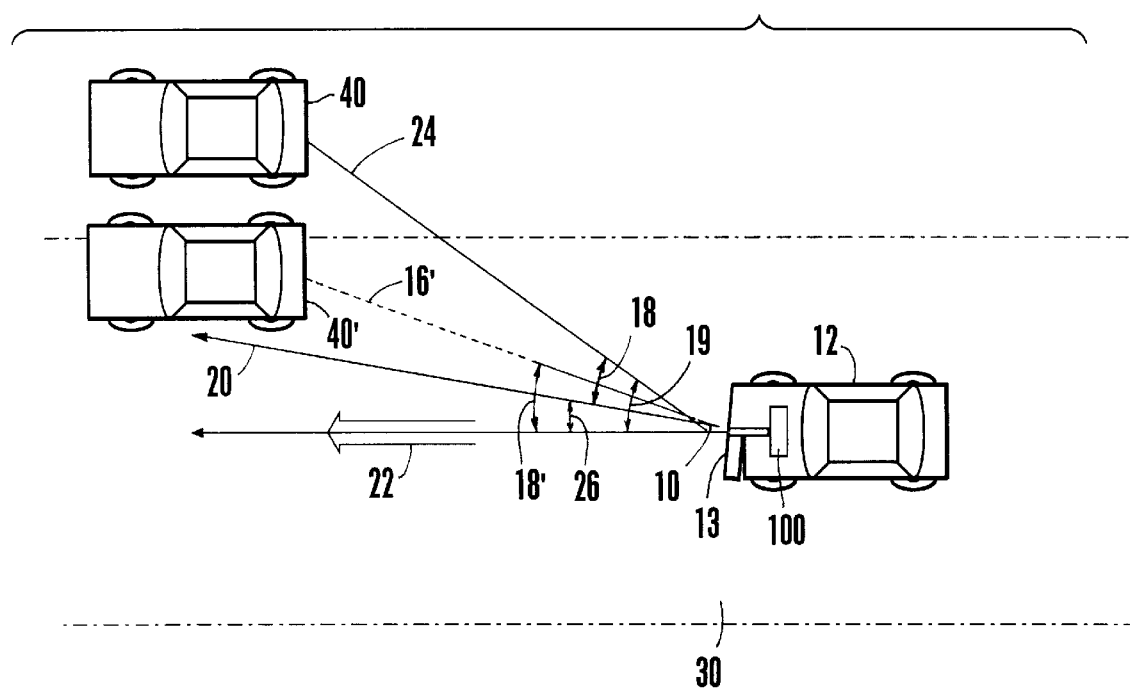

METHOD AND APPARATUS FOR CALIBRATING AZIMUTH BORESIGHT IN A RADAR SYSTEM

BACKGROUND OF THE INVENTION

1. Field of the Invention

This invention relates to radar systems, and more particularly to methods of calibrating the azimuth boresight in radar systems.

2. Description of Related Art

Radio detecting and ranging, commonly referred to as "radar", is used for detecting and locating an object of interest, or "target", using the transmission, reflection, and reception of radio waves. Radar emits radio waves in a pattern emanating from the surface of the radar's antenna. Typically, radar systems are mounted to a platform, such as a tower, airplane, ship, automobile or other motorized vehicle. The objective of these radar systems is to accurately locate the position of an object of interest or target relative to the radar's platform.

A number of radar techniques are well known in the art. Radar systems have been used to determine range, range rate and angular location of objects of interest. Target range rate is determined by taking advantage of the well-known Doppler effect. One distinguishing feature of radar systems is the type of modulation technique used to obtain range and range rate data. Examples of these different radar systems include unmodulated continuous wave (CW) radar, frequency modulated (FM) radar, pulse Doppler radar and frequency shift keying (FSK) radar. Other distinguishing features include differences in antenna types, and in the approach used in extracting angular information about a target.

Radar locates a target's position by obtaining the target's "range" and "azimuth angle" relative to a reference point on the antenna. The reference point typically used by radar systems in defining a target's position is the antenna "boresight." The antenna boresight is defined as an imaginary line that emanates from the center of the antenna and is normal to the antenna's surface. A target's range is the distance from the center of the antenna surface to the target. A target's azimuth angle is the angular distance between the antenna boresight and a line extending from the antenna to the target. Thus defined, a target's range and azimuth angle yield the target's position relative to the radar antenna. Radar systems use the range and azimuth angle data to calculate the target's position relative to the platform upon which the radar system is mounted. However, the radar systems use a reference from the radar platform, not from the radar antenna, to determine the target's position relative to the platform. The radar platform reference is typically defined as a straight line along the platform's line of travel.

Typically, the platform reference does not always correlate exactly with the antenna boresight. Rather, due to mechanical misalignment that occurs over time, installation inaccuracies, accidental or willful damage to the radar's supporting structure on the platform, or other causes, a relative angle exits between the antenna boresight and the platform reference. This relative angle between the antenna boresight and the platform reference is referred to as, the "boresight offset angle $\alpha$." The boresight offset angle may change over time due to physical changes in the platform and the platform mounting. Although the boresight offset angle $\alpha$ typically remains very small, unless it is accounted for by the radar system, the radar system will not accurately calculate the position of targets relative the radar system platform. Therefore, it is essential that the boresight offset angle $\alpha$ be accurately measured and calibrated by the radar system to accurately determine a target's position relative to the radar's platform.

Radar has been used on a wide variety of platforms to detect the position of objects relative to the platforms. For example, radar has been mounted on "host" automobiles and other host vehicles to detect the position of objects (such as other vehicles) on a road relative to the host vehicle. One such vehicular radar system is described in U.S. Pat. No. 5,302,956, issued on Apr. 12, 1994 to Asbury et al. and assigned to the owner of the present invention, which is hereby incorporated by reference for its teachings of vehicular radar systems. Another exemplary vehicular radar system using a "monopulse" azimuth radar for automotive vehicle tracking is described in U.S. Pat. No. 5,402,129, issued on Mar. 28, 1995 to Gellner et al. and assigned to the owner of the present invention, which is also hereby incorporated by reference for its teachings of vehicular radar systems. As described therein, object position data has been used in the prior art collision avoidance systems to brake or steer a host vehicle when the radar system detects a potential collision with another vehicle. In addition, the radar system may be used in an intelligent cruise control system to decelerate the host vehicle when the radar system detects a potential collision with another vehicle and accelerate the host vehicle when the collision danger ends.

In both the collision avoidance systems and the intelligent cruise control systems, an accurate calculation of object position relative to the radar platform (in this case, a host vehicle) is critical for safe system performance. Disadvantageously, due to the misalignment of the radar antenna during the installation of the radar system onto the host vehicle, or due to subsequent physical damage occurring to the host vehicle proximate the radar antenna, heretofore it has been difficult if not impossible to accurately measure and calibrate the boresight offset angle $\alpha$. Consequently, the prior art vehicular radar systems disadvantageously often introduced boresight offset errors when attempting to determine the position of targets and therefore introduced undesirable and sometimes dangerous inaccuracies into the collision avoidance process. Therefore, a need exists for a method and apparatus that can accurately measure and subsequently calibrate the boresight offset angle $\alpha$.

To more fully describe the problems associated with boresight offset error, consider the exemplary collision avoidance vehicular radar systems shown in FIGS. 1 and 2. As shown in FIGS. 1 and 2, a collision avoidance vehicular radar system 100 is mounted on a host vehicle 12. The host vehicle 12 is shown in FIGS. 1 and 2 traveling in a direction of travel 22 on a road 30. As described in U.S. Pat. No. 5,302,956, the radar system 100 cooperates with control systems (not shown) on the host vehicle 12 in a well-known manner to prevent the collision of the host vehicle 12 with other objects on the road 30. For example, as shown in FIGS. 1 and 2, the radar system 100 aids the host vehicle 12 in avoiding collision with other vehicles 40,50 travelling in front of the host vehicle 12 in a direction substantially parallel to the direction of travel 22 of the host vehicle 12. As described below in more detail with reference to FIG. 8, and as disclosed in detail in U.S. Pat. No. 5,302,956, the radar system 100 preferably includes an antenna 10 and a microprocessor or micro-controller 11 (FIG. 8). The antenna 10 preferably is mounted to a front bumper 13 of the host vehicle 12 such that it points in a forward direction substantially parallel to the direction of travel 22 of the host vehicle 12. The microprocessor 11 in the radar system 100 calculates the position of objects detected by the antenna 10 in a well-known manner as exemplified by the monopulse azimuth radar system described in U.S. Pat. No. 5,402,129.

As shown in FIGS. 1 and 2, radar antenna 10 includes an antenna "boresight" 20 that is defined by a line that emanates from the center of the antenna 10 and that is perpendicular to the surface of the antenna 10. The boresight 20 represents a 0° "reference azimuth" extending through the center of the radar beam transmitted by antenna 10. The radar antenna 10 locates "target" vehicles (e.g., vehicles 40 and 50) in a well-known manner by transmitting a transmission signal (radar beam) having a known frequency and sensing the transmission signal as reflected back from the target vehicles. For example, when the radar system 100 comprises a monopulse azimuth radar system (such as that described in U.S. Pat. No. 5,402,129), the antenna 10 transmits a transmission signal and then senses the transmission signal reflected back from the target vehicles in two different physically separated locations of the antenna 10. The antenna 10 of a monopulse radar system is split into two antennas (10a, 10b) that are physically separated by a few centimeters. This separation of the receive antenna 10 provides a "stereo-vision" perspective to the radar system 100. By comparing selected properties of the reflected signals from the two receive antennas, the radar system 100 calculates azimuth angles to target vehicles in front of the host vehicle 12. The azimuth angles to the target vehicles are determined relative to the antenna boresight 20 (0° reference azimuth).

The radar system 100 also determines the range and closing rate (velocity relative to the host vehicle 12) of a selected target vehicle in a well-known manner. For example, a target's range can be determined in one embodiment by measuring phase differences in Doppler channel frequencies derived from the transmission signals reflected back from the target and received by the radar antenna 10. A target's closing rate is determined by analyzing the well known "Doppler frequency shift" in the signal returned from the target.

The radar system 100 preferably determines the location of a target vehicle 40 relative to the antenna 10 by calculating both a range value ("R") 16 and an azimuth angle of the target vehicle 40. The range R 16 to the target vehicle 40 is defined as the distance from the center of the radar antenna 10 to the target vehicle 40. The azimuth angle is defined as the angular distance from a 0° reference azimuth to a target line 24 formed from the center of the antenna 10 to the target vehicle 40. Ideally, the radar system 100 should use the boresight 20 as the 0° reference azimuth to determine an azimuth angle 18 of the target vehicle 40 relative to the host vehicle 12. All determinations of the azimuth angles to potential targets are ideally made relative to this 0° reference azimuth antenna boresight 20. Disadvantageously, due to practical limitations, the prior art radar systems (e.g., the radar system 100) use the antenna boresight 20, and not the direction of travel 22, for the 0° reference azimuth when determining an azimuth angle 19 for the target vehicle 40. That is, the prior art radar systems assume that the antenna boresight 20 coincides exactly and is perfectly aligned with the direction of travel or "heading" 22 of the host vehicle 12 as shown in FIG. 1. As long as the antenna boresight 20 and heading 22 are perfectly aligned, as shown in FIG. 1, the target azimuth angle 19 (measured relative to the direction of travel 22) will be exactly equal to the ideal target azimuth angle 18 (measured relative to the antenna boresight 20).

Unfortunately, the antenna boresight 20 frequently becomes misaligned with the host vehicle's direction of travel 22 due to mechanical misalignment that occurs over time, installation inaccuracies, accidental or intentional damage to the radar's supporting structure on the host vehicle 12 (e.g., damage or misalignment of the front bumper 13 with the main compartment of the host vehicle 12). Such a misalignment of the antenna boresight 20 and the direction of travel 22 is shown graphically in FIG. 2.

As shown in FIG. 2, because of misalignment of the antenna 10 relative to the host vehicle 12, a boresight offset angle "$\alpha$" 26 is introduced into the target azimuth calculations which leads to target location miscalculations. The boresight offset angle $\alpha$ 26 is defined as the angular distance between the vehicle's direction of travel 22 and the antenna boresight 20. Referring to FIG. 2, and as described above with reference to FIG. 1, if the boresight offset angle 26 were zero (i.e., the ideal case with no misalignment of the antenna radar 10), the radar system 100 would accurately determine the position of the target vehicle 40 by calculating both the azimuth angle 18 (measured relative to the boresight 20 and direction of travel 22) and a range 16 for the target vehicle 40. Unfortunately, due to a non-zero boresight offset angle $\alpha$ 26, the prior art radar systems miscalculate the position of target vehicle 40 as being located in the position of phantom target vehicle 40'.

The radar system 100 calculates the range 16' of the target 40' as described above. However, the radar system 100 miscalculates the target azimuth angle 18 as having a phantom target azimuth angle 18' because it interprets the returned target azimuth angle 18 of the target vehicle 40 as being relative to the direction of travel 22, and not relative to the true antenna boresight 20. Thus, the radar system 100 dangerously identifies the target vehicle 40 as being at the position of phantom vehicle 40' having an azimuth angle 18' relative to the direction of travel 22, rather than as being at the true position of vehicle 40 having an azimuth angle 19 relative to the direction of travel 22. This miscalculation creates a very dangerous situation for collision avoidance systems. False alarms are generated when the radar system 100 mistakenly determines that a target vehicle is in the host vehicle's direction of travel when, in fact, it is not. These false alarms can cause sudden braking and unnecessary steering of the host vehicle 12, which can lead to collisions with the target vehicle or other objects on the road 30.

Even in systems that merely warn the host vehicle operator of potentially dangerous scenarios, the false alarms can create a nuisance condition for the operator of the host vehicle 12. The false alarms caused by the boresight offset angle can cause the operator of the host vehicle 12 to lose faith in the reliability of the radar system 100 and render the system ineffective for warning the operator of real threats. In addition, such false alarms are distracting and disturbing to the operator.

The errors caused by the introduction of the boresight offset angle 26 can be corrected either physically by moving the antenna 10 to align the antenna boresight 20 with the direction of travel 22 or mathematically by accounting for the misalignment in calculating the target azimuth angles. However, regardless of the correction method used, in determining the location of targets using a radar system, it is essential to detect the presence of a boresight offset angle, accurately measure the angle, and calibrate the radar system accordingly.

One prior art approach for generating corrected azimuth signals in a radar system is described in U.S. Pat. No. 4,929,952, issued to Schneider et al., on May 29, 1990. The system described by Schneider et al. uses a separate "stable" reference source to provide data pertaining to the platform vehicle's (e.g., a ship) pitch, roll and heading. The separate reference source can be a ship's gyrocompass, inertial navigation system or the like. Disadvantageously, the separate reference source required by this approach introduces errors into the corrected azimuth calculations because it does not provide exact positional data of the detected targets. In addition, the algorithms used to calculate the corrected azimuth data are disadvantageously relatively complex. Thus, this prior art approach demands precious system resources and takes an unacceptable amount of time to generate corrected azimuth calculations. In addition, the technique disclosed by Schneider et al. requires additional space on the platform to accommodate the separate reference source. Yet another disadvantage of the technique described by Schneider et al. is the expense associated with the purchase and maintenance of the separate reference source.

Accordingly, a need exists for a simple, inexpensive solution to the problem of detecting, measuring and calibrating the antenna azimuth boresight of a radar system. More specifically, a need exists for a method and apparatus that can detect, accurately measure and account for errors introduced by a boresight offset angle between the antenna boresight and the direction of travel of the host platform. Such a method and apparatus should be simple to implement, inexpensive, and should work with existing radar systems. The present invention provides such a solution.

SUMMARY OF THE INVENTION

The present invention is a novel method and apparatus for calibrating azimuth boresight in a radar system. Due to the misalignment of a host platform's direction of travel with a radar antenna boresight, errors can be caused when determining the position of targets relative to the host platform. These errors can be corrected by detecting and accurately measuring a boresight offset angle α, which is defined as an angle between the antenna boresight and the direction of travel or heading of the host vehicle. The present invention provides a method and apparatus for detecting and accurately measuring the boresight offset angle in a radar system and calibrating the azimuth boresight accordingly. The present invention improves target location performance in a radar system by reducing the errors introduced by boresight misalignment. Three fairly simple and easily implemented boresight calibration techniques are described.

In accordance with a first boresight calibration technique of the present invention, the radar system measures the range and target boresight azimuth angle of a target vehicle at two time instances, $t=t_n$, and $t=t_{n+1}$. The boresight offset angle α is calculated in accordance with the following mathematical formula:

$$\alpha = \frac{\gamma_{n+1}\beta_{n+1} - \beta_n}{1 - \gamma_{n+1}};$$

where $$\gamma_{n+1} = \frac{R_{n+1}}{R_n},$$

and $\beta_{n+1}$=target boresight azimuth angle at time instant $t_{n+1}$;
$\beta_n$=target boresight azimuth angle at time instant $t_n$;
$R_{n+1}$=target range at time instant $t_{n+1}$; and
$R_n$=target range at time instant $t_n$.

A modification of this technique requires that the radar system obtain more than one successive target data measurement. Boresight offset angles are calculated at every time instance subsequent to the initial time instant $t_n$. The results are averaged to reduce errors caused by noise. In one example, the range and azimuth measurements are obtained at six successive time instances subsequent to the initial time instance. Once the boresight offset angle is calculated the antenna boresight is calibrated using one or more well-known techniques. For example, the antenna boresight can be physically calibrated by moving the radar antenna the required angular distance to compensate for the calculated boresight offset angle. Alternatively, the antenna boresight can be mathematically calibrated by summing the calculated boresight offset angle with the measured target azimuth angle. In any case, the radar system returns to normal operation using the calibrated antenna boresight until another boresight calibration is deemed necessary.

Second and third calibration techniques of the present azimuth boresight calibration invention rely upon the observation that of all of the targets having non-zero velocities relative to the host vehicle, only the one directly in line with the host vehicle's direction of travel will experience insignificant target azimuth angle changes when measured at successive time instances. Therefore, if such a "qualified calibration" target exists, the calibration target's measured boresight azimuth angle β can be used as an estimate of the antenna boresight offset angle α. To qualify as a calibration target for these purposes, the target must be within a pre-determined target detection range, it must move along the direction of travel of the host vehicle, and it must have a non-zero target velocity relative to the host vehicle that falls within a pre-determined velocity range. In addition, the magnitude of the signal reflected back to the antenna from the qualifying target is preferably greater than a minimum threshold every time the target range and azimuth measurements are obtained by the radar system.

A modification of the second technique requires that the radar system obtain more than one successive target data measurement for the qualified calibration target. To qualify at each successive time instant, the vehicle range, signal magnitude, and velocity must satisfy pre-determined threshold values. The calibration target's boresight azimuth angle (and therefore, the boresight offset angle) is computed at each successive time instance, and the angles are averaged to reduce the detrimental effects attributable to measurement noise. The average of the boresight offset angles is used to determine a computed boresight offset angle, α.

The third calibration technique uses a qualified azimuth histogram (QAH) method whereby a histogram of qualified azimuth readings is produced for discrete azimuth angles. Histograms are maintained for a pre-determined maximum number of qualified azimuth readings (maximum number of counts per histogram). The boresight offset angle is determined from the azimuth angle having the highest number of counts.

The calibration techniques can be improved by imposing very strict restrictions that a target must meet before it will be considered as a qualified candidate for use in the boresight azimuth calibration (i.e., before it can be used as a "calibration target"). Fundamentally, the restrictions are that the host vehicle must be on a straight road and that the calibration target must traverse a minimum range change while maintaining a constant azimuth angle with respect to the host vehicle. Other restrictions may be imposed to suppress adjacent vehicle traffic from being mistakenly identified as a calibration target. These restrictions include requiring the target to meet minimum thresholds for signal magnitude, radar-cross-section, and signal-to-noise ratios. Adjacent lane traffic can be further suppressed by restricting the calibration targets to be loosely speed-matched with the host vehicle.

The details of the preferred and alternative embodiments of the present invention are set forth in the accompanying drawings and the description below. Once the details of the invention are known, numerous additional innovations and changes will become obvious to one skilled in the art.

BRIEF DESCRIPTION OF THE DRAWINGS

FIG. 1 shows the geometric relationship between a host vehicle and a target vehicle, wherein the host vehicle has a radar system and radar antenna mounted thereon, and wherein the antenna boresight is perfectly aligned with the heading of the host vehicle.

FIG. 2 shows the geometric relationship between the host and target vehicles of FIG. 1, wherein the antenna boresight is misaligned with the heading of the host vehicle.

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The azimuth boresight calibration method and apparatus of the present invention increases the accuracy of locating targets in radar systems. Several embodiments of the present method and apparatus are described. For example, two exemplary methods for calculating an antenna boresight offset angle are presented hereinbelow. These two methods can be independently executed within a radar system to improve the target detection accuracy of the system. The choice of which method to use will depend upon the specific system requirements and available resources within a particular radar system. Alternatively, both methods can be used concurrently by a radar system to verify the results generated by each method, thus providing an improved target detection system having location determination redundancy.

It will be obvious to one skilled in the radar and target detection art that alternative methods of determining the boresight offset angle may be used without departing from the scope of the present invention. In addition, although the azimuth boresight calibration method and apparatus of the present invention is described as being used in a vehicular radar system for collision avoidance, the present invention is contemplated for use on any radar platform where target detection and location is desirable.

Figure 3:
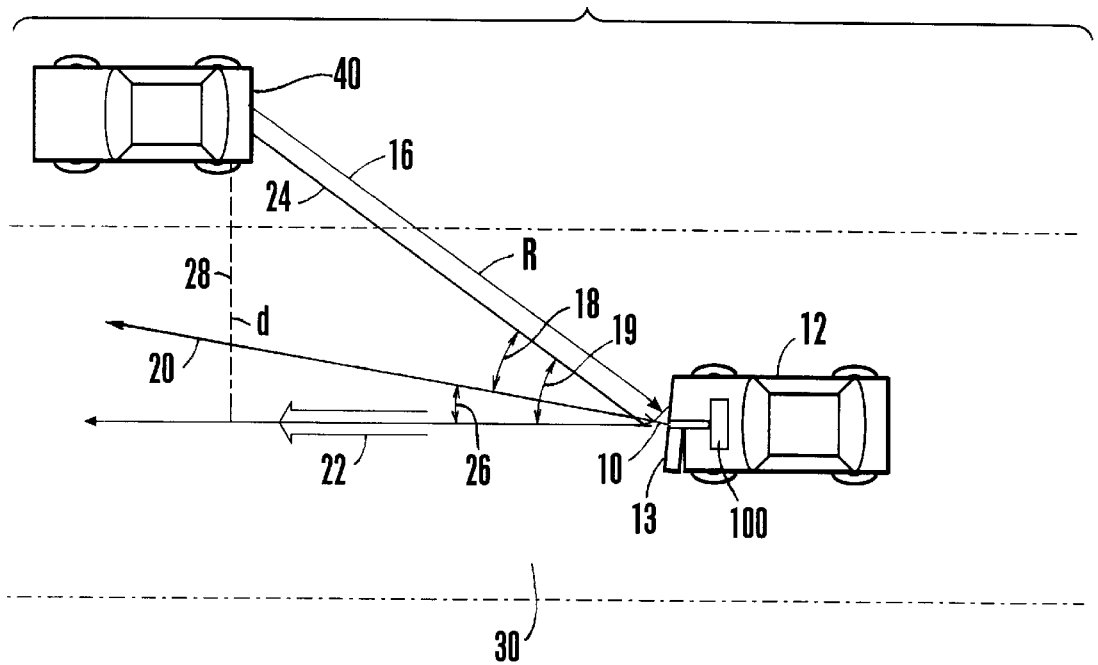
FIG. 3 is a graphic representation of the corrections to target azimuth that are required in a vehicular radar system adapted for use with the present invention.

FIG. 3 is a graphic representation of the corrections to target azimuth that are required in a vehicular radar system adapted for use with the present invention. As shown in FIG. 3, a vehicular radar system 100 is deployed on a host vehicle 12. As described in more detail below with reference to FIG. 8, the vehicular radar system 100 preferably comprises a prior art vehicular radar system adapted for use with the present invention. One such prior art radar system is described in U.S. Pat. No. 5,402,129, issued on Mar. 28, 1995 to Gellner et al. and assigned to the owner of the present invention. Any other convenient radar system can be utilized by the present invention provided that the radar system 100 is capable of determining the range and azimuth angle of detected targets. Using the method and apparatus of the present invention, the vehicular radar system 100 aids the operator of the host vehicle 12 in detecting and avoiding collisions with objects that present a danger to the host vehicle 12. The present invention improves the accuracy and reliability of target detection and location determination functions performed by the vehicular radar system 100 and thereby improves the overall collision avoidance performance of the system 100.

Two primary functions are performed by the azimuth boresight calibration method and apparatus of the present invention: (1) a "boresight offset" angle, $\alpha$, is detected and measured; (2) the azimuth boresight is corrected in light of the measured boresight offset angle $\alpha$. The azimuth boresight may be corrected by physically moving the antenna so that the boresight offset angle becomes zero (i.e., the antenna is moved so that the antenna boresight and the direction of travel are perfectly aligned). Alternatively, the azimuth boresight may be corrected mathematically by accounting for the measured boresight offset angle when the radar system 100 performs its target range and azimuth calculations. Using this latter approach, as described in more detail below with reference to FIG. 3, the boresight offset angle $\alpha$ is preferably summed with a measured target boresight azimuth angle, $\beta$, to determine the true target azimuth angle. Using the former approach, the radar boresight is preferably physically moved $\alpha$ degrees to align with the antenna boresight with the direction of travel of the host vehicle 12.

As shown in FIG. 3, the present invention is disposed on the host vehicle 12 that is shown travelling along a road 30 in a direction of travel 22. A vehicular radar system 100 is preferably deployed within the host vehicle 12 and preferably includes a microprocessor 11 and an radar antenna 10. The method of the present invention preferably comprises software or firmware instructions that are executed by the microprocessor 11 or other data processing or sequencing device disposed within the radar system 100. Alternatively, the method can comprise software or firmware instructions that are executed by any convenient or desirable sequencing device such as a state machine, present state-next state discrete logic, or field programmable gate array device. In another alternative embodiment, the present azimuth boresight calibration method is "hardwired" into the radar system 100 and implemented using either discrete logic devices, large scale integrated (LSI) devices, very large scale integrated (VLSI) devices., or application specific integrated circuit (ASIC) devices. Vehicular radar system 100 may be deployed in any convenient location within the host vehicle 12, such as under the front hood, under the dashboard, within the interior cab, in the trunk, etc.

The radar antenna 10 is preferably mounted to a front bumper 13 of the host vehicle 12. Alternatively, the radar antenna 10 may be mounted to any other convenient surface on the host vehicle 12, such as the front grill, provided that the antenna 10 generally faces in a forward direction substantially along in the direction of travel 22 of the host vehicle. In the preferred embodiment of the present invention, the radar antenna 10 comprises a dual lobe monopulse antenna for transmitting a radar transmission signal and receiving the signals reflected back from a target vehicle such as a target vehicle 40 shown in FIG. 3. Alternatively, the radar antenna comprises a single patch array antenna capable of both transmitting and receiving radar transmission signals. Due to the phase of the signals transmitted from the two lobes of the monopulse antenna 10, the transmission signal appears to emanate from a single location within the antenna 10. The transmitted signal travels from the antenna 10 to the target vehicle 40 where it is reflected. The target vehicle 40 reflects the transmission signal back to the two lobes of the antenna 10. As described in U.S. Pat. No. 5,402,129 in more detail, the radar system 100 determines the amplitude difference between the received signals sensed by the antenna lobes by determining the sum thereof and the difference therebetween and then computing a ratio of the sum and difference signals. The radar system 100 uses information derived from the sum and difference signals in a well-known manner to determine the range R 16 and azimuth angle of the target vehicle 40. However, as described above with reference to FIGS. I and 2, due to boresight offset errors present in the system, the target azimuth angle computed by the radar system 100 is in error and the position of the target vehicle 40 is thereby miscalculated by the system 100.

Therefore, an important object of the present invention is to accurately detect the position of the target vehicle 40 by detecting and measuring a boresight offset angle α 26. As described above with reference to FIGS. 1 and 2, the boresight 20 of the antenna 10 frequently becomes misaligned with the direction of travel 22 of the host vehicle 12 creating a boresight offset error depicted in FIG. 3 as the boresight offset angle α 26. The boresight offset angle α 26 is the angle that is formed between the antenna boresight 20 and the direction of travel (or "heading") 22 of the host vehicle 12. The radar system 100 detects transmission signals reflected back from the target vehicle 40 and received by the antenna 10 and uses these signals to calculate a target azimuth angle β 18. The target azimuth angle β 18 is measured with respect to the antenna boresight 20. That is, the target azimuth angle β 18 is the angular distance between the antenna boresight 20 and a target line 24 formed from the center of the antenna 10 to the target vehicle 40. However, to correctly determine the position of the target vehicle 40, the radar system 100 must determine the azimuth angle 19 which is the angular distance between the host vehicle's heading 22 and the target line 24. Once the boresight offset angle α 26 is measured by the radar system 100, the radar system 100 can compensate for the errors created by the offset. For example, in one preferred embodiment, the radar system 100 mathematically corrects the target azimuth angle β 18 by summing the two angles, β 18 and α 26, to produce the correct target azimuth angle 19.

In an alternative embodiment, the present invention calibrates the azimuth boresight by physically moving the antenna 10 to align the boresight 20 with the host vehicle's heading 22. Typically, the boresight offset angle α 26 is relatively small. Consequently, only a very small movement of the antenna 10 is required to align the boresight 20 with the host vehicle's heading 22. Methods and mechanisms for moving the antenna 10 are well known and a detailed description thereof is not necessary for purposes of understanding the present invention. For example, the radar antenna 10 may be supported by gimbals that are electromechanically controlled to achieve the desired movement of the antenna 10. The gimbals may be controlled in an open or closed-loop manner depending upon system requirements. Alternatively, a pneumatic or hydraulic servo-mechanism may be used whereby the servo-mechanism is controlled by the radar system 100.

In one embodiment of the present invention, the radar system 100 comprises a monopulse radar system using Doppler and monopulse technology to obtain range rate, range 16, R, and target boresight azimuth angle 18, β. Alternatively, the present invention may utilize a switched beam, frequency scanned, or mechanically scanned radar. Monopulse radar operates with its antenna and energy beam fixed in one position. This allows continuous tracking data on all targets in the antenna detection range without having to interrupt the data flow to switch beams or mechanically rotate the antenna 10. Typically, monopulse radar systems can measure the target boresight azimuth angle 18 over a range from approximately 6 degrees to the left of boresight 20 to 6 degrees to the right of boresight 20 (for a total radar beam width of approximately 12 degrees). The beam width varies with the power delivered to the antenna 10. It should be obvious to one skilled in the radar art that the present invention can be used with radar systems having antenna beam widths greater and smaller than 12 degrees.

As described below in more detail, the present azimuth boresight calibration method and apparatus uses several techniques to calculate the azimuth boresight offset angle 26 shown in FIG. 3. The first technique described below calculates the boresight offset angle α 26 using only the range R 16 and the target azimuth angle 18 β data generated by the radar system 100 at two different time instants. The second and third techniques calculate the boresight offset angle α 26 using target range, azimuth angle, and closing rate data. All three techniques rely upon certain geometric relationships between the host vehicle 12 and a target vehicle.

A First Calibration Technique for Calculating Azimuth Boresight Offset Angle

In one embodiment of the present invention, the radar system 100 measures the range and target boresight azimuth angle of a target vehicle 40 at two instants of time, $t=t_n$, and $t=t_{n+1}$. In order to be qualified as an acceptable target vehicle for purposes of calibrating the azimuth boresight there must be no appreciable change in the target vehicle's horizontal distance d 28 at the two time instants $t=t_n$, and $t=t_{n+1}$ (i.e., the horizontal distance d 28 to the heading 22 at time instant $t_n$ must be substantially equal to the horizontal distance d at time instant $t_{n+1}$).

Referring now to FIG. 1, it is obvious that:

where α is the boresight offset angle 26, β is the target boresight azimuth angle 18, d is the horizontal distance d 28, and R is the range to the target vehicle 40.

However, under normal circumstances, the angle formed by the sum of the boresight offset angle 26 and the target boresight azimuth angle β (i.e., the correct target azimuth angle 19) is a relatively small angle, and therefore the sine of this angle is approximately equal to the angle itself:

Observing the target vehicle 40 at two time instants, $t=t_n$, and $t=t_{n+1}$, the radar system 100 determines the target boresight azimuth angles $\beta_n$ and $\beta_{n+1}$ and the target ranges $R_n$ and $R_{n+1}$ at the time instants $t=t_n$, and $t=t_{n+1}$, respectively. It follows from that:

For time instances $t_n$ and $t_{n+1}$:

$$\alpha + \beta_{n+1} = \frac{d}{R_{n+1}}; \quad \text{and } \alpha + \beta_n = \frac{d}{R_n}$$

The value d 28 is unknown, however because it is present in both equations, we can use it solve for the angle α 26 as follows:

$$d = R_{n+1}(\alpha+\beta_{n+1}) = R_n(\alpha+\beta_n).$$

Dividing both sides by the value of Rn and rearranging the equation:

$$\alpha + \beta_n = \frac{R_{n+1}(\alpha + \beta_{n+1})}{R_n}$$

Now, solving for a:

$$\alpha = \frac{R_{n+1}(\alpha + \beta_{n+1})}{R_n} - \beta_n;$$

simplifying:

$$\alpha = \frac{\alpha R_{n+1} + R_{n+1}\beta_{n+1} - R_n\beta_n}{R_n}$$

$$\alpha - \frac{\alpha R_{n+1}}{R_n} = \frac{R_{n+1}\beta_{n+1} - R_n\beta_n}{R_n}$$

Factoring out α:

$$\alpha\left(1 - \frac{R_{n+1}}{R_n}\right) = \frac{R_{n+1}\beta_{n+1} - R_n\beta_n}{R_n}$$

and solving for α yeilds the following equation referred to hereafter as "Equation 1":

$$\alpha = \frac{\gamma_{n+1}\beta_{n+1} - \beta_n}{1 - \gamma_{n+1}}; \quad \text{(Equation 1)}$$

where $$\gamma_{n+1} = \frac{R_{n+1}}{R_n},$$

and $\beta_{n+1}$=target boresight azimuth angle at time instant $t_{n+1}$
$\beta_n$=target boresight azimuth angle at time instant $t_n$
$R_{n+1}$=target range at time instant $t_{n+1}$
$R_n$=target range at time instant $t_n$.

The first azimuth boresight calibration technique of the present invention uses Equation 1 to calculate the boresight offset angle α 26. This calibration technique preferably executes on any radar system that locates target positions by obtaining a target boresight azimuth angle and target range for each target vehicle. In contrast to the second calibration technique described below, this first technique does not require information pertaining to the target's closing rate. In one preferred embodiment, the first calibration technique obtains the target boresight azimuth angle and target range data for each target vehicle using a monopulse radar system similar to that described in U.S. Pat. No. 5,402,129. However, any convenient radar system can be used in cooperation with this calibration technique providing that the radar system is capable of determining both the range and azimuth angle of a target vehicle.

Figure 4:
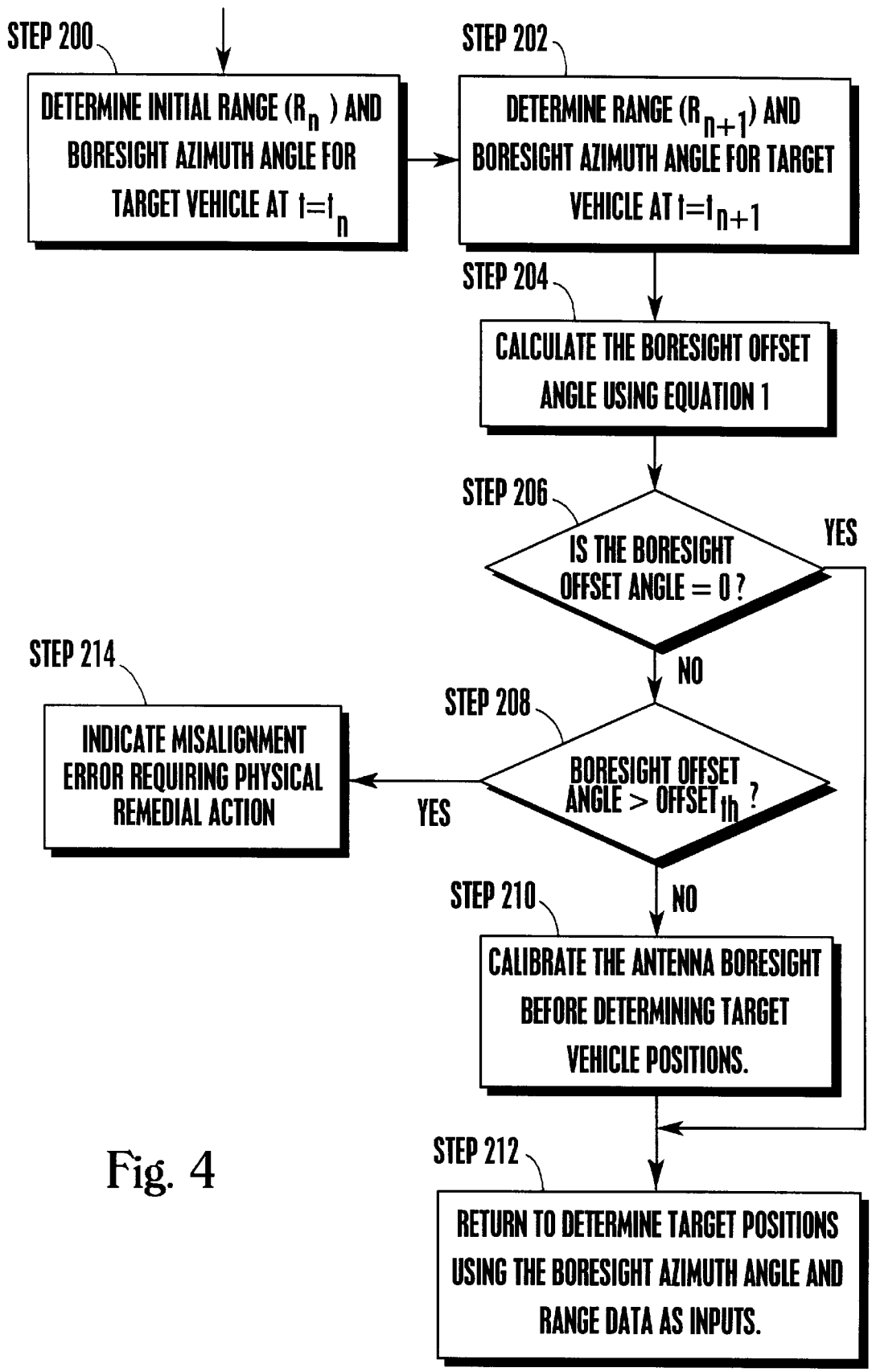
FIG. 4 shows a flowchart of the first azimuth boresight calibration technique of the present invention.

FIG. 4 shows a flowchart of the first azimuth boresight calibration technique of the present invention. As shown in FIG. 4, the method begins at STEP 200 by first determining the range $R_n$ 16 (FIG. 3) to a target vehicle 40 at a first time instant $t=t_n$. In one preferred embodiment of the present invention, the target vehicle 40 is preferably at a range $R_n$ of approximately 150 to 250 feet from the host vehicle 12 when the initial measurements are performed at STEP 200. However, initial measurements can also be used when the target vehicle 40 is closer or further from the host vehicle 12. In addition, in the preferred embodiment, the magnitude of the signal reflected back from the target vehicle 40 at time $t=t_n$ exceeds a pre-determined threshold value. For example, in one embodiment, the magnitude of the signal reflected back from the target vehicle 40 exceeds 100 dB. Again, however, the present method can accurately calibrate the azimuth boresight using initial target vehicle data when the signal magnitude is less than 100 dB. As shown in FIG. 4, at STEP 200 the present method also determines the target boresight azimuth angle $\beta_n$ at time instant $t=t_n$.

In accordance with the present azimuth boresight calibration method, at STEP 202 the method determines the range $R_{n+1}$ of the target vehicle 40 at a subsequent time instant $t=t_{n+1}$. The method also determines the target boresight azimuth angle $\beta_{n+1}$ at the time instant $t=t_{n+1}$. At STEP 204 the first azimuth boresight calibration technique calculates the boresight offset angle α using the method set forth in Equation 1 described above. The method proceeds to STEP 206 to determine whether the boresight offset angle α calculated at STEP 204 is equal to zero. If so, no boresight offset error exists and therefore no azimuth boresight calibration is required. Therefore, if the offset angle is equal to zero, the method proceeds to STEP 212 and returns the system to determine target positions using the boresight azimuth angles and range data measured by the radar system 100. In this case, the antenna boresight 20 and host vehicle's heading 22 are perfectly aligned as shown in FIG. 1. However, in most cases the boresight 20 and heading 22 will be misaligned as shown in FIGS. 2 and 3, and therefore method will determine at step 206 that the boresight offset angle 26 is non-zero. In this case, the method proceeds to STEP 208.

At STEP 208, the present method checks to determine whether the boresight offset angle α calculated at STEP 204 is greater than a predetermined boresight offset threshold value "Offset$_{th}$". If the misalignment between the antenna boresight 20 and the vehicle's heading 22 is excessive the radar antenna's field of view will be grossly squinted and the radar system's performance may become unacceptable. In this case, the radar antenna 10 may require physical adjustment (i.e., the misalignment is so excessive that it cannot be automatically calibrated using the present invention). In one radar system, the boresight offset threshold value Offset$_{th}$ is approximately 4 degrees. However, the threshold can be varied to accommodate specific system requirements. If the boresight offset angle α calculated at STEP 204 is determined at STEP 208 to be less than or equal to the predetermined boresight offset threshold value Offset$_{th}$, the method proceeds to calibrate the antenna boresight at STEP 210. As described above, many approaches are possible for calibrating the antenna boresight, including but not limited to physically moving the antenna 10 the amount required to compensate for the boresight offset angle. Alternatively, the antenna boresight can be calibrated mathematically by summing the two angles, β 18 and α 26, to produce the corrected target azimuth angle 19. No matter the calibration approach used by the system, the method proceeds to STEP 212 to continue "normal" operation. The system returns to determining target positions using the calibrated azimuth boresight until another boresight calibration is required.

Although the boresight offset angle α 26 can be determined as shown in FIG. 4 by measuring target data at only two time instances ($t_n$ and $t_{n+1}$), it is possible to increase the accuracy of the calibration method of the present invention by obtaining successive target data measurements and calculating boresight offset angles at every time instance subsequent to the initial time instant $t_n$. Therefore, the calibration technique shown in FIG. 4 can be modified so that instead of obtaining merely one measurement at time instant $t_{n+1}$, several measurements can be obtained as the time approaches $t_{n+1}$. To reduce the detrimental effects that can be caused by measurement noise, an average of several successive range and target azimuth measurements are obtained, particularly as the time instances approach the last time instant. Because the target azimuth differences taken at different time instances become much more pronounced at shorter and shorter range values, it is preferred to use a target vehicle that is closing relative to the host vehicle 12.

In one preferred embodiment, the method measures six successive range and target azimuth values at six successive time instances. Equations 2 and 3 show how this modified calibration technique calculates the boresight offset angle α using this modification of the first azimuth boresight calibration technique of the present invention:

$$\gamma_i = \frac{(R_{n+1})_i}{R_n}, \quad \text{(Equation 2)}$$

where i=1,2, . . . ,6;

$$\alpha_i = \frac{\gamma_i(\beta_{n+1})_i - \beta_n}{1 - \gamma_i}, \quad \text{(Equation 3)}$$

where i=1,2, . . . ,6.

In this example, six different boresight offset angles are calculated corresponding to the six different successive time instances (i.e., t=1, t=2, t=3, . . . t=6). As shown in equation 4 below, a final boresight offset angle α 26 is then determined by averaging the six calculated boresight offset angles.

$$\alpha = \frac{\sum_{i=1}^{6} \alpha_i}{6} \quad \text{(Equation 4)}$$

As described above, in one preferred embodiment, it is preferred that the initial range and target azimuth angle is obtained when the target is at a range of approximately 200 feet from the host vehicle, and when the target has a reflected signal magnitude of at least 100 dB. It is also preferable to obtain the successive range and target azimuth measurements when the target vehicle 40 is at a range of approximately 50 feet from the host vehicle 12, provided that the signal magnitude at each successive measurement is at least 100 dB. In alternative embodiments, these restrictions on the target vehicle need not be rigidly followed in order to use the present azimuth boresight calibration method. However, in the preferred embodiment, a range change rate of approximately 150 feet between the first measurement ($t=t_n$) and the last successive time instant (e.g., $t=t_6$) is desirable in order to achieve an estimation accuracy of approximately 0.2 degrees. The target tracking period will vary with the target's closing velocity. Although the qualifying restrictions on the target vehicle described with reference to the preferred embodiment may, under some circumstances, limit the qualification of a number of target vehicles, it should be noted that azimuth calibration will be required infrequently. Therefore, only a few target vehicles must qualify over a long period of radar system operation. Consequently, the restrictions described above with reference to the preferred embodiment should not adversely affect the utility of the present invention.

Figure 5:
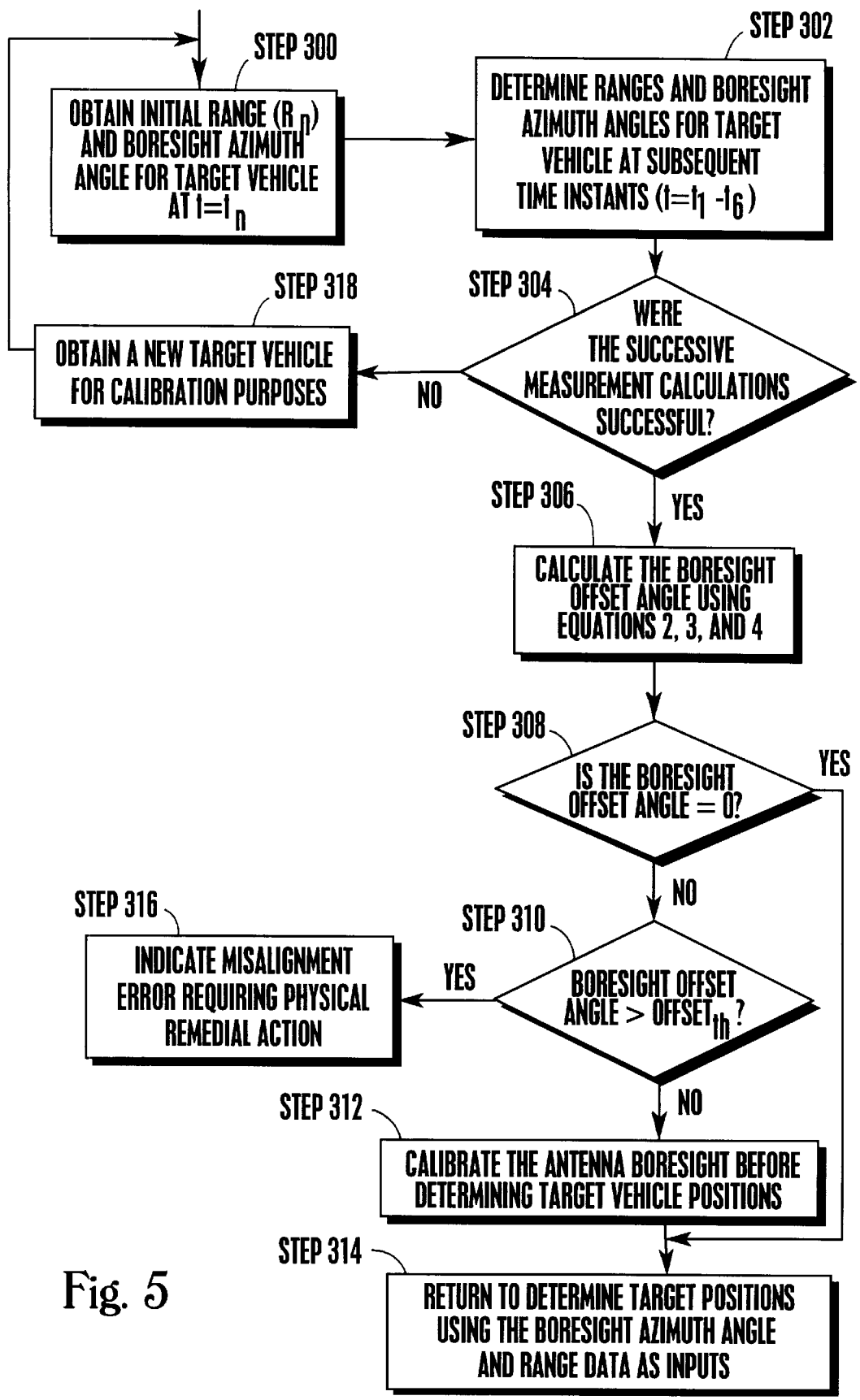
FIG. 5 shows a flowchart of the modified version of the first azimuth boresight calibration technique shown in FIG. 4.

FIG. 5 shows a flowchart of the modified version of the first azimuth boresight calibration technique of the present invention. As shown in FIG. 5, the method begins at STEP 300 by first determining the range $R_n$ 16 (FIG. 3) to a target vehicle 40 at a first time instant $t=t_n$. The method proceeds to STEP 302 where the target ranges and target azimuth angles are obtained at successive time instances ($t=t_1, t_2, t_3, \ldots, t_6$). As described above, these measurements are preferably obtained when the target vehicle 40 is at a range of approximately 50 feet from the host vehicle and when the signal magnitude of the reflected radar transmission signal is greater than a pre-determined threshold value such as 100 dB. These restrictions are tested at decision STEP 304. If any of the successive measurements fail to meet this qualifying criteria, then the method proceeds to STEP 318 whereat the method is started all over again using a new target vehicle. However, if the six successive measurements were obtained correctly, the method proceeds to STEP 306 to calculate the boresight offset angle using Equations 2, 3 and 4 described above. The method proceeds to STEP 308 whereat the boresight offset angle is analyzed further. The remaining STEPS 308, 310, 312, 314 and 316 correspond to and operate exactly as analogous steps (i.e., STEPS 206, 208, 210, 212 and 214, respectively) described above with reference to FIG. 4.

When the calibration method is used in a vehicular radar system, the radar system's target azimuth angle is corrected for the calculated antenna boresight offset angle before being used for collision warning and cruise control functions. Each newly calculated boresight azimuth offset angle α replaces a previously calculated value. The calibration techniques described above with reference to FIGS. 4 and 5 are opportunistic in the sense that many targets may be monitored continuously in order to find a qualifying target vehicle. Furthermore, the opportunity for calibration may be explored using a number of targets concurrently and continuously.

A Second Calibration Technique for Calculating Azimuth Boresight Offset Angle—Tracked Azimuth Lane Averaging (TALA)

The second calibration technique of the present azimuth boresight calibration method relies upon the simple observation that of all of the targets having non-zero velocities relative to the host vehicle 12 (FIG. 3), only the one directly in line with the host vehicle's direction of travel 22 will experience insignificant target azimuth angle changes when measured at successive time instances. Therefore, if such a target exists, the target's measured boresight azimuth angle β can be used as an estimate of the antenna boresight offset angle α. Stated another way, with no lane changes and straight roads, any target that provides a constant azimuth over a measurable range traverse can only be directly in front of the host vehicle. This particular constant azimuth will therefore reveal any error in antenna alignment.

Thus, to qualify as a candidate for azimuth calibration purposes, the target must be within a pre-determined target detection range, it must move along the direction of travel 22 of the host vehicle, arid it must have a non-zero target velocity relative to the host vehicle 12 that falls within a pre-determined velocity range. In addition, in the preferred embodiment, the magnitude of the signal reflected back to the antenna 10 from the qualifying target vehicle is preferably greater than a pre-determined threshold value (e.g., 100 dB) each time the range and target azimuth values are obtained.

Similar to the first calibration technique described above with reference to FIGS. 4 and 5, although this calibration technique can operate using only two target azimuth angle measurements obtained at two different time instances (e.g., at t=tn and t=tn+1), the preferred approach obtains several target azimuth angle measurements at several successive time instances. However, to qualify at each successive time instant, the vehicle range, signal magnitude, and velocity must satisfy certain pre-determined threshold values. For example, in the preferred embodiment, the vehicle velocity must be equal to or greater than 15 ft./sec. The signal magnitude should exceed a pre-determined threshold value at each successive measurement. Also, in the preferred embodiment, the vehicle range must remain between 50 and 200 feet from the host vehicle 12 throughout the observation interval. Should the change in the vehicle's range throughout the observation interval not exceed 100 feet, the technique is preferably terminated and a new target vehicle is sought.

The steps necessary to implement this calibration technique are summarized as follows:

Step 1—Select a qualifying target vehicle that is within a pre-determined detection range and that has pre-determined velocity range relative to the host vehicle. Measure an initial target boresight azimuth angle, α, for the qualifying target vehicle and store it as $\Psi_0$.

Step 2—Obtain at least one subsequent target boresight azimuth angle $\beta_i$ and store it as $\Psi_i$.

Step 3—For each subsequent boresight azimuth angle $\Psi_i$ stored during Step 2, determine the difference between $\Psi_i$ and $\Psi_0$. If the absolute value of the difference for any of the subsequent values is greater than an arbitrary safety factor, delta, then return to step 1. Else, proceed to step 4. Ideally, delta equals zero. In the preferred embodiment, delta equals about 0.5 degrees.

Step 4—Using equations 5 and 6 below, average all of the boresight offset angles to determine the computed boresight offset angle, α.

$$\Psi_{sum} = \sum_{i=1}^{N} \Psi_i \quad \text{(Equation 5)}$$

$$\alpha = \frac{\Psi_{sum}}{N} \quad \text{(Equation 6)}$$

Figure 6:
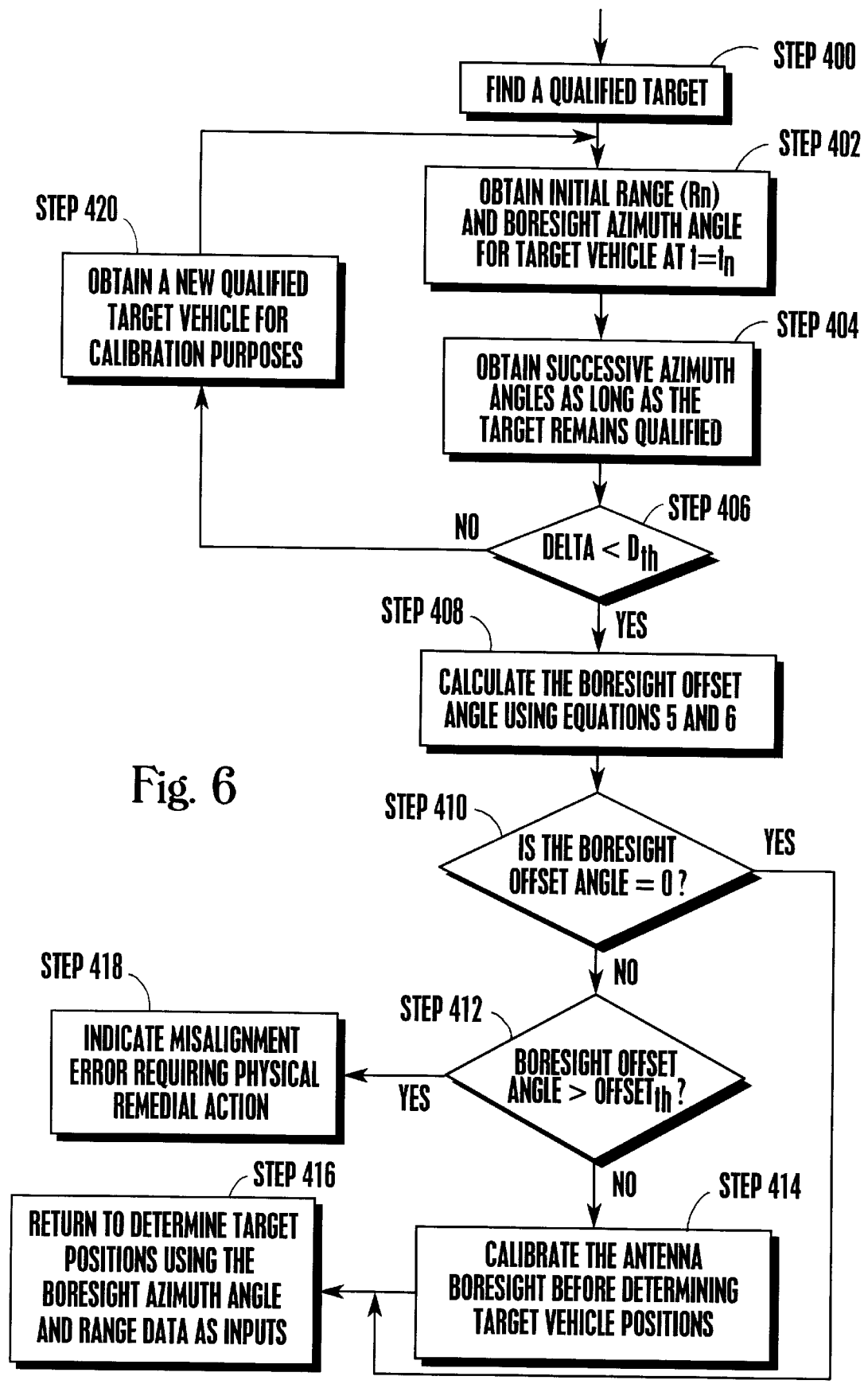
FIG. 6 shows a flowchart of a second azimuth boresight calibration technique of the present invention using a tracked azimuth lane averaging (TALA) method.

FIG. 6 shows a flowchart of the second azimuth boresight calibration technique of the present invention. As shown in FIG. 6, and as summarized above, the method begins at STEP 400 by finding a "qualified" target for calibration purposes. To qualify, a target preferably has the range, relative velocity and signal magnitude values described above. The present method is opportunistic because many targets can be continuously monitored to find a target that meets the requirements of having a non-zero relative velocity and is within pre-determined detection range for pre-determined period of time. Once a qualified target is found, the method proceeds to STEP 402 whereat an initial range and boresight azimuth angle is obtained. At STEP 404 the method obtains at least one, and preferably more than one (i.e., N, where N is greater than one), successive target azimuth angles for the qualified target providing that it continues to meet certain qualifying restrictions at each time instance. As described above, in the preferred embodiment, these qualifying restrictions include the requirement that the target vehicle remain at a range of between approximately 50 and 200 feet, have a signal magnitude exceeding a pre-determined threshold, and have a total range change during the observation interval that exceeds 100 feet. If these conditions are not met at any time during the observation interval (i.e., during any successive target measurement), the method terminates and returns to STEP 400.

At STEP 406, the method determines whether the change or delta between the boresight offset angles measured at two consecutive successive time instances (as determined at STEP 404) exceeds a predetermined threshold value $D_{th}$. If it does, the method terminates and proceeds to STEP 420 to find a new qualified target vehicle. In one preferred embodiment, three consecutive failures are required before the method will terminate (i.e., the delta between boresight offset angles must exceed $D_{th}$ during three consecutive time instances before the method will terminate. In addition, in the preferred embodiment, $D_{th}$ is approximately 0.5 degrees.

If the target remains qualified throughout the measurement process, and the delta between consecutive boresight offset angles does not exceed the pre-determined threshold, the method proceeds to STEP 408 to calculate the boresight offset angle using Equations 5 and 6 supra.

The remaining steps, STEP 410, 412, 414, 416 and 418 proceed identically to analogous steps (e.g., STEPS 308, 310, 312, 314, and 316, respectively of FIG. 5) of FIGS. 4 and 5. When the opportunity for calibration occurs as described above, a new value for the boresight azimuth offset angle α replaces the previous value.

Statistical Improvements to the Second Calibration Technique

The second calibration technique described above with reference to FIG. 6 can be improved by imposing very strict restrictions that a target must meet before it will be considered as a qualified candidate for use in boresight azimuth calibration (i.e., before it can be used as a "calibration target"). Fundamentally, the restrictions are that the host vehicle 12 (FIG. 3) must be on a straight road and the calibration target must traverse a minimum range change while maintaining a constant azimuth angle with respect to the host. These basic restrictions assume that only targets that maintain a constant azimuth trajectory while traversing a significant change in range will remain aligned with the heading 22 of the host vehicle 12 and therefore qualify for calibration purposes. The combination of a large change in range and a constant azimuth angle reading reduces the possibility of erroneously qualifying an adjacent lane vehicle as a calibration target and thereby mis-calibrating the antenna boresight based on adjacent lane traffic.

However, adjacent lane vehicles that maintain a radial trajectory can cause problems. Unless restrictions are placed upon the potentially qualified targets, these uncooperative targets can mistakenly be deemed qualified calibration targets and consequently lead the boresight calibration technique described above to calibrate the antenna boresight using a vehicle in the adjacent lane. Therefore, a need exists for an improved calibration technique that will reduce or eliminate the possibility of qualifying adjacent lane traffic as calibration targets for boresight calibration purposes.

There are at least two radial trajectory maneuvers that can lead to mistakenly qualifying an otherwise unqualified target: vehicle lane changes and changes in road curvature. Buffering the observation data until the host vehicle 12 reaches a point on the road where the target was last seen can mitigate the latter problem. The target should then only be eligible for boresight correction if the entire segment of road is straight. Slow lane change maneuvers, however, are more difficult to filter out.

A Third Calibration Technique for Calculating Azimuth Boresight Offset Angle—Qualified Azimuth Histogram (QAH)

Given a sufficiently long period of time, traffic should be equally distributed over all of the traffic lanes. If this assumption is valid, then the probability that a target will appear in a designated lane, such as the host vehicle lane, should be equal to the probability that the target will appear in any other lane (e.g., an adjacent traffic lane). While it may be reasonable to assume that targets will likely be in any given lane at any given time instant, they will not be equally distributed across the entire width of the road. Most vehicles will tend to drive in the center of their selected lane of travel and will tend to avoid lane dividers except during traffic maneuvers. The targets therefore will tend to be clustered about the traffic lane centers. Thus, it is more probable that a vehicle will be observed by the host vehicle 12 radar system 100 to be proximate one of the lane centers than otherwise.

Although the targets will generally be equally clustered about the traffic lane centers, this will not be the case from the perspective of the host vehicle 12. On a straight road, the center of the adjacent lane is approximately 12 feet away from the host vehicle 12. For a point target having a cross-range of 12 feet, the target will be at least approximately 1.5 degrees from the antenna boresight at the maximum detection range of the antenna (i.e., the point target will have an azimuth of approximately 1.5 degrees when it is at the furthest point of detection from the host vehicle 12). As the target moves closer and closer to the host vehicle 12, its azimuth angle will increase until it reaches a maximum value equal to the field of view of the radar antenna 10. In one embodiment, the field of view of the radar antenna is approximately 6 degrees. Because the adjacent lane traffic will tend to be evenly distributed over a sufficiently long period of time, the target azimuth angles of adjacent lane traffic will tend to be spread between 1.5 to 6 degrees over the observational range of the antenna.

In contrast, the azimuth angles of target vehicles travelling in the same lane as the host vehicle 12 will not be significantly range dependent. All other factors being equal, the azimuth angles observed for adjacent lane traffic should be spread out over a few more degrees than are the azimuth angles observed for host lane traffic. Therefore, on a straight road, the azimuth probability distribution of targets observed by the host vehicle will have a maximum at boresight, a pair of nulls corresponding to the center lane edges, and another pair of broad peaks corresponding to the adjacent lane centers, and then another pair of nulls, and so forth. Stated in another way, target azimuth data received by a host vehicle traveling in random lanes with random traffic patters, and over sufficient time, will show an angle with the highest frequency of occurrence corresponding to an orientation directly in front of the host vehicle. The azimuth angle mapping of the normal flow of traffic on a straight road therefore can be used to provide azimuth truth in a statistical sense, and can therefore be used to qualify calibration targets for use in the second boresight calibration technique described above.

Thus, one relatively simple and straightforward technique for qualifying targets for boresight calibration purposes is to keep a tally of qualified targets that meet a set of pre-determined conditions for a given set of discrete azimuth angles. The antenna boresight is estimated from the azimuth angle having the highest count over a pre-determined time period. As described above, one of the pre-determined conditions is that the host vehicle 12 must be on a straight road throughout the observational period. Therefore, this technique may use a gyroscope or other means for measuring the turn rate of the host vehicle 12. The turn rate should be maintained below a selected turn rate threshold. In one embodiment, the turn rate threshold is approximately ½ degree/second. Another condition is that the host vehicle's velocity be maintained above a minimum velocity threshold. This ensures that the radius of curvature is sufficiently large to allow it to be treated as a straight road. In one embodiment the host vehicle minimum velocity threshold is approximately 65 ft/second. In alternative embodiments, both the turn rate and host vehicle minimum velocity thresholds can be varied slightly.

In one preferred embodiment, an azimuth histogram is created for qualified targets for a given set of discrete azimuth angles. As target data is received, a count is added to each discrete azimuth angle in the histogram for qualified targets until a pre-determined maximum histogram count is reached. In the preferred embodiment, the pre-determined maximum histogram count is 4,096. When the pre-determined maximum histogram count is reached, the boresight misalignment angle is determined from the azimuth angle having the greatest number of counts. In one embodiment, a filter operation is performed on each subsequent histogram containing the pre-determined maximum histogram count.

In this embodiment, the azimuth histogram is initialized with 19 bins, each bin 0.25 degrees in width from −2.00 to +2.00 degrees. Each bin is initialized to 0 counts except the bin corresponding to 0 degrees, which is initialized to 4,096. The following filter operation is performed on each azimuth histogram containing 4,096 counts:

$$a[bin, n]=(1-g)*a[bin, n-1]+g*a[bin, n];$$

where: a=azimuth bin count for the current total 4,096 count histogram;
n=histogram number;
bin=histogram bin; and
g=filter gain. In one embodiment, the filter gain is 1/16.

Figure 7:
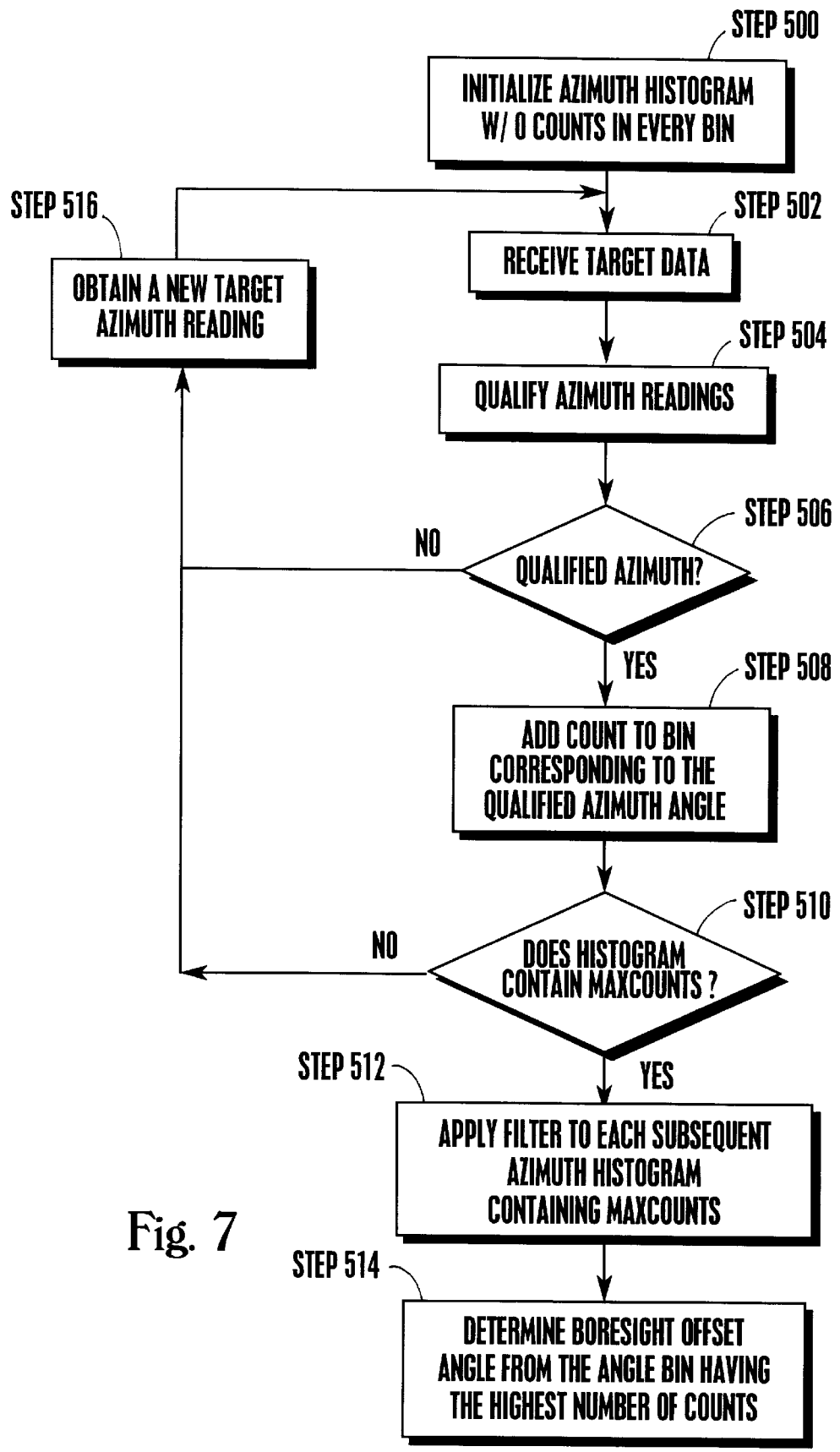
FIG. 7 shows a flowchart of a third azimuth boresight calibration technique of the present invention using a qualified azimuth histogram (QAH) method.

FIG. 7 shows a flowchart of one preferred embodiment of the qualified azimuth histogram (QAH) calibration technique of the present invention. As shown in FIG. 7, the QAH calibration technique begins at STEP 500 by initializing the azimuth histogram. In one preferred embodiment, the azimuth histogram is initialized with 19 bins, 0.25 degrees in width, from −2.00 to +2.00 degrees. Alternatively, more or less bins (of varying widths) may be used. In addition, the coverage of the bins can be greater or less than 4.0 degrees in total. Each bin is initialized to zero at STEP 500 (with the exception of the bin corresponding to zero degrees, which is initialized with a value of a predetermined maximum number (e.g., in one embodiment, 4,096)). Target data is received at STEP 502. The method proceeds to STEP 504 whereat the azimuth target readings are qualified. As described below in more detail, certain restrictions are placed on the target data to ensure that the boresight calibration is performed properly. In one embodiment, the target readings are discarded unless the target data meets the following restrictions:
(1) data taken when host vehicle speed>=70 ft./second
(2) absolute value of the host vehicle turn rate<=0.6 degrees/sec
(3) target signal magnitude>82 dB
(4) target RCS>15 dB
(5) target signal to noise>30 dB
(6) target relative speed to host<0.12*host vehicle speed
(7) target range>75 feet from host vehicle
(8) absolute value of target azimuth angle<=2.00 degrees As described below in more detail, other parameters may be used to qualify the target data for use in the calibration techniques of the present invention. Further, all of the qualifying restrictions can be varied without departing from the scope of the present invention. The values given above are exemplary only and were obtained through experimentation.

At STEP 506, the QAH calibration method determines whether the azimuth angle data is qualified. If not, the method proceeds to STEP 516 and obtains a new azimuth angle reading. However, if the azimuth angle data is qualified, the method proceeds to STEP 508 and increments the count of the bin that corresponds to the qualified azimuth angle. The method proceeds to STEP 510 whereat the method determines whether the histogram contains a pre-determined maximum number of counts referred to as "MaxCounts." In one preferred embodiment, MaxCounts equals 4,096 counts. If the histogram does not contain the maximum number of counts, the method proceeds to obtain a new target azimuth reading at STEP 516. However, if the histogram contains a MaxCounts number of counts, the method proceeds to STEP 512. As described above, in one preferred embodiment, a filter operation is performed for each subsequent histogram containing a MaxCounts number of counts. This filter operation is performed at STEP 512. The method proceeds to STEP 514 to determine the boresight offset angle. As described above, the boresight offset angle is determined from the azimuth angle bin having the highest number of counts.

This qualified azimuth histogram (QAH) technique is slightly more accurate than the tracked azimuth lane averaging (TALA) technique described above with reference to FIG. 6. The tracking software can create small biases during propagation that are not present in the qualified data. As is the case using the first and second calibration techniques, as long the radar system is, capable of providing azimuth measurements of potential targets, this QAH technique can be used to independently calculate the azimuth boresight offset angle. However, in contrast to the first two techniques, this QAH technique does not require that the radar system 100 have target tracking capability. The QAH technique processes "pre-tracking" data obtained from targets. In contrast, the first two techniques process post-tracking data. Therefore, the QAH technique advantageously avoids some of the eccentricities and complexities introduced by target tracking algorithms. In addition, this QAH technique advantageously may be used in a radar system that does not have target tracking capabilities.

The QAH calibration technique of the present invention requires a priori statistical knowledge about the azimuth distribution of radar targets in the environment of interest. In an automotive application, the a priori statistical knowledge is that vehicles tend to travel along the center of travel lanes. When used in a typical "on-road" environment, there is a very high probability that a vehicle will be within a travel lane at any given instant in time. The fact that vehicles tend to be in their travel lanes implies a structured relationship between the vehicles that are sharing the road at any given time. Consequently, the QAH calibration technique works well when an a priori knowledge regarding the azimuth distribution of radar targets exists. In contrast, the structured relationship between vehicles does not hold in "off-road" environments. In "off-road" environments, there may not be any roads or travel lanes to superimpose a known structure on the distribution of "off-road" vehicles or radar targets. Hence, the QAH calibration technique is not valid and therefore should not be used in "off-road" vehicle environments.

A potential problem associated with this simple technique occurs when traffic is not equally distributed in all of the traffic lanes. The worst case occurs when one of the adjacent lanes is occupied with targets a greater percentage of time than is the host vehicle lane. If there is never any host vehicle lane traffic within the maximum detection range of the host vehicle, and if there is adjacent lane traffic that satisfies the pre-determined conditions, this technique could calibrate on adjacent lane traffic and thereby corrupt the azimuth boresight calibration. Therefore, additional conditions and qualifying restrictions should be established to enable this technique to accurately qualify a vehicle for boresight calibration purposes even when there is more traffic in the adjacent traffic lanes. Therefore, the following conditions should be used to suppress adjacent lane traffic from being erroneously qualified as a calibration targets for use with the calibration techniques described above.

The inventors have found that minimum threshold requirements for target signal magnitude, radar-cross-section, and signal-to-noise ratios are all extremely useful in suppressing adjacent lane traffic. For a target having a given radar-cross-section, at a given target range, the magnitude of the reflected signal is azimuth angle dependent. This is due to the two-way sensitivity pattern of the radar antenna 10. When a sufficiently high signal magnitude threshold is selected, the probability that a target will satisfy this minimum threshold is strongly azimuth angle dependent. For example, in one embodiment of the present invention, targets at boresight will typically have a 15 dB advantage towards satisfying the minimum threshold as compared to targets at 6 degrees from boresight. The radar estimate of radar-cross-section is simply a range-adjusted variation of signal magnitude. The signal-to-noise ratio is a noise-adjusted variation of signal magnitude. Therefore minimum thresholds for target signal magnitude, radar cross-section, and signal-to-noise values can be used to suppress the use of adjacent lane traffic for calibration purposes. In one embodiment, the thresholds for signal magnitude, radar-cross-section and signal-to-noise are: 81, 15, and 26 dB, respectively. These thresholds can be varied in alternative embodiments to meet system parameters.

The restrictions placed on targets using the minimum target signal magnitude and radar-cross-section thresholds take advantage of the radar-cross-section signature characteristics of most vehicles. Most vehicles have a rosette radar-cross-section pattern in azimuth. Because most vehicles are basically "box-shaped", they have a very high radar-cross-section normal to each side of the "box." Only the reflected signal from the tail end of the vehicle is relevant to the third boresight calibration approach described above. However, when the target vehicle's tail end is normal to the host vehicle radar antenna, it will usually generate a large specular return. Therefore, by imposing target signal magnitude and radar-cross-section threshold requirements upon potentially qualifying targets, the target-host geometry tends to square up potential targets with the host vehicle. At a minimum, these thresholds will select targets that have a radial trajectory with respect to the host vehicle.

Another means for suppressing adjacent lane vehicles from being erroneously qualified as calibration targets takes advantage of the observation that, generally speaking, relative target velocity is azimuth angle dependent. As a rule of thumb, the traffic in the lane to the left of the host vehicle 12 generally moves faster than the host vehicle, and the traffic in the lane to the right of the host vehicle generally moves slower than the host vehicle. Certainly, in certain jurisdictions (e.g., those requiring traffic to drive on the left-hand side of the road rather than the right-hand side) the opposite will be true (i.e., the right lane traffic will move faster, and the left lane traffic will move slower than the host vehicle will). In either case, relative vehicle speed can be used as a means for suppressing adjacent vehicles from being erroneously qualified as calibration targets.

By requiring a calibration target to have a velocity that is somewhat similar to that of the host vehicle, a significant number of adjacent lane vehicles are suppressed from becoming qualified for calibration purposes. Calibration targets using this technique are targets of opportunity in the normal flow of traffic that satisfy several conditions. By restricting the calibration targets to be "loosely speed-matched" with the host vehicle 12 (i.e., meet a predetermined relative speed match threshold), a significant percentage of adjacent lane traffic is excluded from the calibration target data set. In one embodiment, the relative speed match threshold is approximately 12%. Using this threshold, only target vehicles having a ground speed greater than 0.88*host-velocity and less than 1.12*host-velocity are eligible for the azimuth boresight correction technique described above. In alternative embodiments the relative speed match threshold can be varied to meet system requirements.

As described above with reference to the third calibration technique of the present invention, target range can also be used to qualify a target as a calibration target. At extremely close ranges the azimuth angle of a target tends to become chaotic. Therefore, a minimum target range threshold is preferably required for calibration targets. However, in practical terms, the minimum range threshold has a marginal impact on the algorithm. When the host vehicle 12 travels at highway speeds there is only a marginal amount of target data that is closer than the minimum range threshold and that also meets all of the other calibration target requirements described above.

In summary, the calibration techniques described above can be improved by imposing certain restrictions on the techniques and requiring targets to meet certain predetermined threshold values before they can be used for boresight calibration purposes. Specifically, the host vehicle should be travelling at a velocity that exceeds a pre-defined minimum host vehicle velocity threshold. In addition, to ensure that the calibration technique operates while the host vehicle is on a relatively straight road, the host vehicle should turn at a rate no greater than a maximum host vehicle turn rate. Further, minimum threshold requirements for the target signal magnitude, radar-cross-section, and signal-to-noise ratios can be imposed to suppress adjacent lane traffic. Adjacent lane traffic can be further suppressed by restricting the calibration targets to be loosely speed-matched with the host vehicle 12. Finally, although a target range requirement has very little practical significance, a minimum range threshold can be imposed to further qualify a target vehicle as a calibration vehicle.

Figure 8:
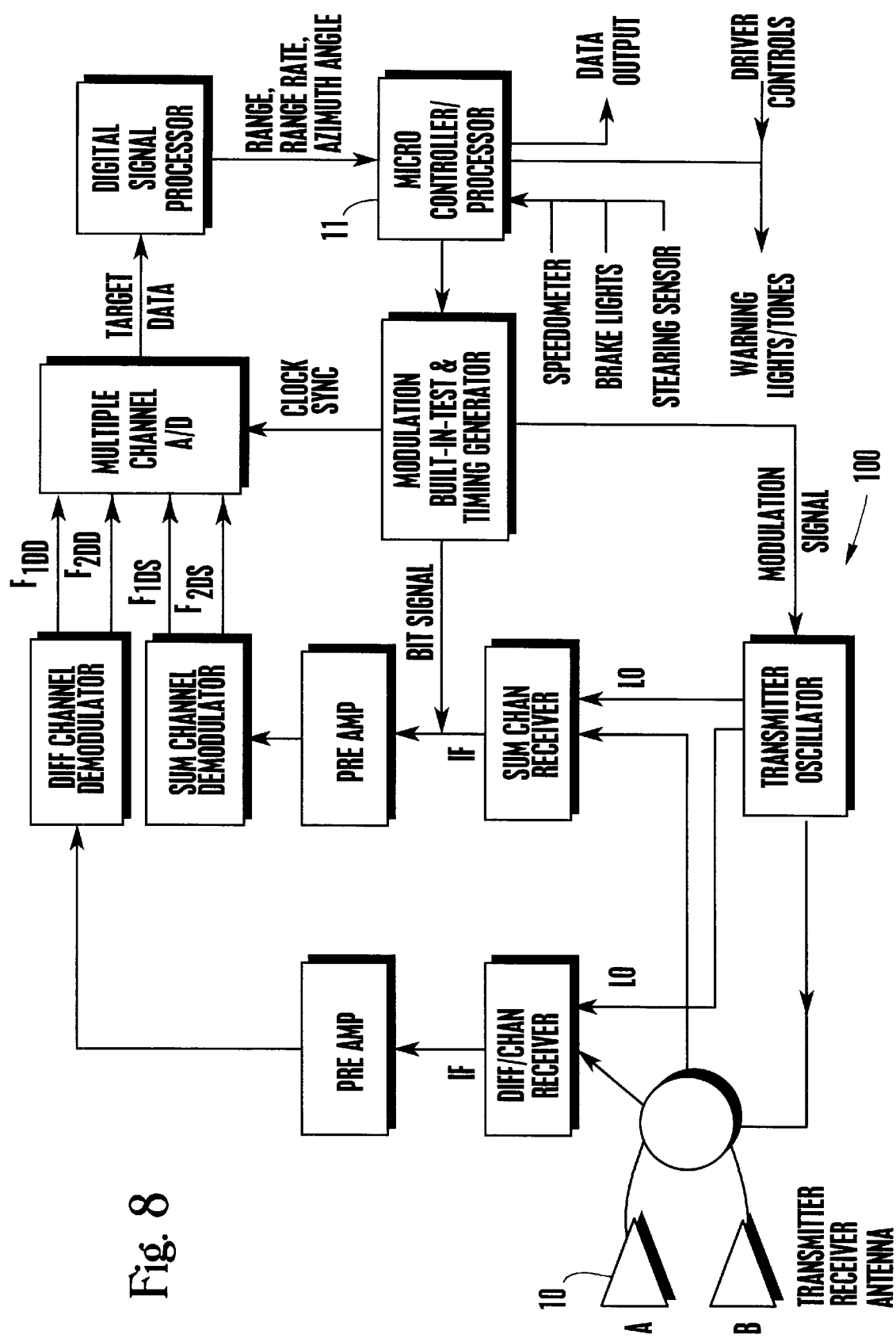
FIG. 8 shows a block diagram of a radar system adapted for use with the boresight calibration method and apparatus of the present invention.

FIG. 8 shows a block diagram of radar system 100 that may be adapted for use with the boresight calibration method and apparatus of the present invention. An understanding of the function and operation of many of the components of the radar system 100 are not essential to understanding the present invention and therefore are not described in detail herein. A more detailed description of the radar system 100 is provided in U.S. Pat. No. 5,402,129. Radar system 100 is preferably a monopulse radar system and a multiple-frequency modulated system that uses a very narrow bandwidth and is thus extremely spectrum efficient. The narrow-band system was developed to operate in the existing FCC Part 15 unlicensed band at 24.725 GHz with an authorized bandwidth of only 100 MHz. Alternatively, 46.8 GHz and 76.5 GHz can be used to allow bandwidths of 200 MHz and 1000 MHz, respectively. The frequency and bandwidth are variable and are not limitations of the present invention. In one embodiment, the antenna has a 3 dB half-power beamwidth that is 6 degrees in azimuth and 5 degrees in elevation with an antenna aperture size of 15 cm high by 20 cm wide.

Radar antenna 10 comprises an etched-patch, flat antenna both to transmit and receive, and a gallium arsenide (GaAs) GUNN diode oscillator with a balanced Schottky diode mixer receiver and associated circuitry on a microwave integrated circuit (MIC). Typically, the transmitter power delivered to the antenna is 0.5 milliwatts. The amount of power is variable and is not a limitation of the present invention. The radar system 100 includes a digital signal processor that calculates a Fast Fourier Transform (FFT) which is used to identify, discriminate, and track multiple targets. Alternatively, a state machine, present state-next state discrete logic, or field programmable gate array device can be used to process the signal. The radar system 100 operates in a well-known manner to determine the range rate, range, R, and target boresight azimuth angle, $\beta$ of a target.

As described above, the radar system 100 preferably includes an antenna 10 and a microprocessor or microcontroller 11. The boresight calibration techniques described above with reference to FIGS. 1–7 preferably comprise software instructions that are executed by the microprocessor 11 in the radar system 100. Alternatively, the calibration techniques may be implemented in firmware or hardware specifically designed for the purpose. Any convenient means for implementing the calibration techniques described above may be used by the radar system 100 without departing from the scope of the present invention.

Combining the Results of more than one Calibration Technique

Correcting the boresight entails considerable risk. Making an erroneous boresight correction, when the correction is, in fact, unnecessary, is far worse than making no correction at all. To make the calibration technique more robust, any two or all three calibration techniques described above may be used in obtaining two or three independent estimates of the boresight offset angle. These estimates may then be combined in some weighted manner thereby producing a robust estimate of the boresight offset angle. Many weighted combination techniques are available and are well-known in the art.

In one embodiment of the present invention, the estimates produced by the second (TALA) and third (QAH) calibration techniques are combined if the difference between the computed estimates is less than a pre-determined threshold value (e.g., less than 0.3 degrees). In accordance with this embodiment, if the difference between the estimates produced by the TALA and QAH techniques is less than a pre-determined threshold, the final estimate of the boresight offset angle is equal to the average of the computed estimates (i.e., the two computed estimates are weighted equally). Other alternative approaches are possible without departing from the scope of the present invention.

Some general guidelines for combining the results of the TALA and QAH techniques should be noted. First, a boresight correction, and a subsequent azimuth adjustment should be permitted only when the two techniques agree within some predetermined minimum threshold value of each other. For example, in the preferred embodiment, the correction should be allowed only when the two techniques agree within 0.3 degrees of each other. Second, to avoid correction "jitter" problems, a correction should not be allowed if the new correction value does not vary from the previous correction value by some minimum threshold such as 0.3 degrees. Further, the QAH technique should control the flow of the calibration method because its changes occur far less frequently than do the TALA changes. Also, the QAH technique tends to be more reliable than the TALA technique.

When the QAH technique converges, and the computed estimates do not agree within the pre-determined minimum threshold value, a new comparison should be performed with each new estimate produced by either technique. This subsequent comparison might occur with the next TALA-produced estimate or with the next QAH convergence. Also, if several TALA-produced estimates are produced before a QAH convergence, the TALA estimates should be averaged. This averaged estimate should then be used to compare with the QAH estimate. In one embodiment, a minimum number of most-recent TALA estimates are averaged before the comparison with the QAH estimate. Additional filtering of these values may also be used. For example, TALA estimates that vary by more than a maximum amount (e.g., 0.5 degrees) from the mean will be discarded from the average. If all of the recent TALA estimates are greater than 0.5 degrees from the mean, the most recent TALA estimate is used.

Figure 9:
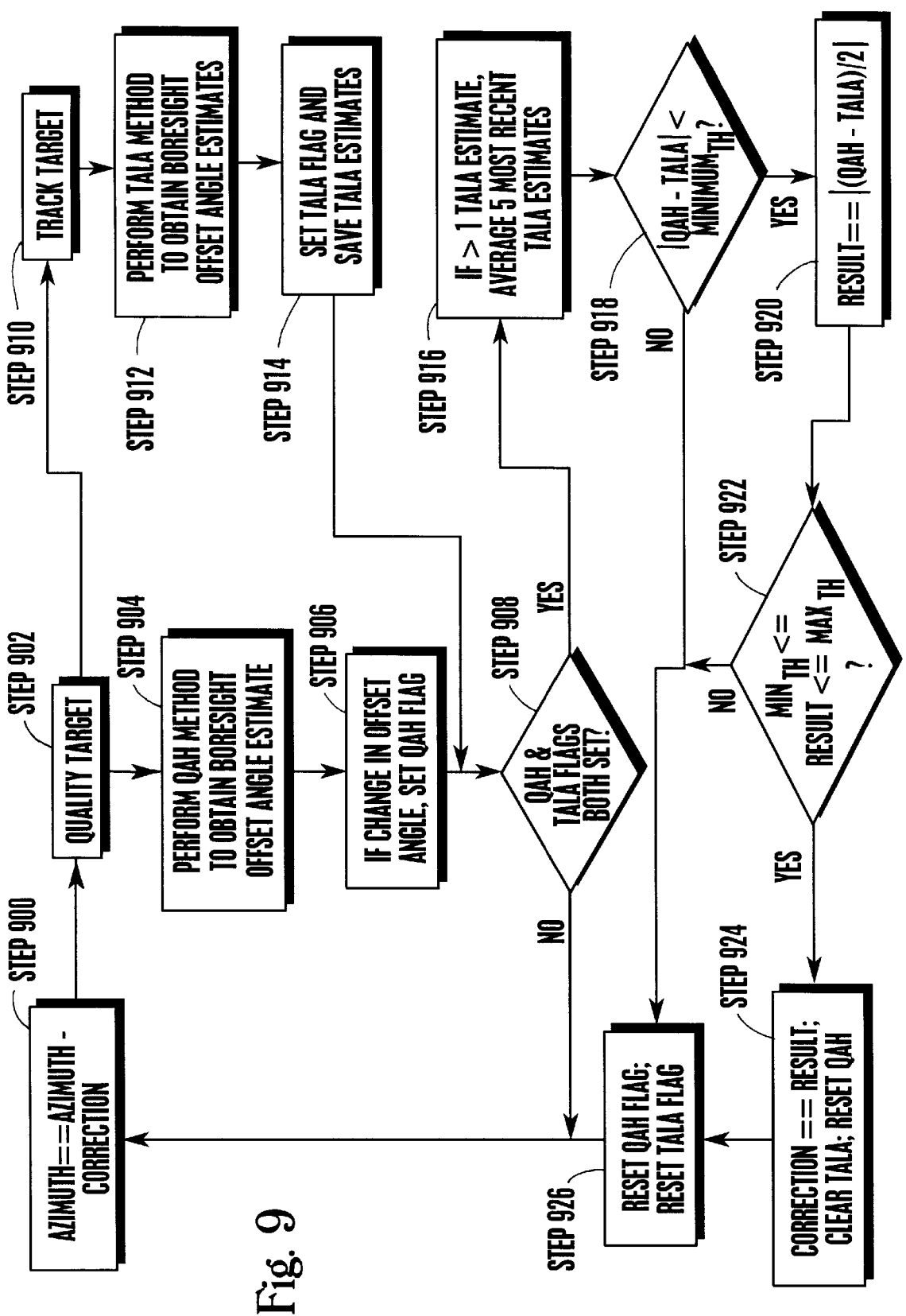
FIG. 9 shows a flowchart of a method of combining the estimates computed using the TALA calibration technique of FIG. 6 with the QAH calibration technique of FIG. 7 to yield a more robust estimate of the boresight offset angle.

FIG. 9 shows a flowchart of this technique whereby the estimates computed by the TALA and QAH calibration techniques (described above with reference to FIGS. 6 and 7, respectively) are combined to yield a more robust estimate. Initially, the value of the "correction" term is set to zero. Thus, at a STEP 900, the boresight azimuth angle is set to the value that it had before this combination method is performed. Targets are qualified using the restrictions described above at STEP 902. As shown in FIG. 9, the combination method then proceeds to both STEPS 910 and 904 concurrently. The target is tracked at STEP 910 and the TALA calibration method described above with reference to FIG. 6 produces boresight offset angle estimates at STEP 912. As described above, the QAH technique controls the flow of the combination method. The TALA method produces a maximum of five updates while waiting for the QAH method to generate a change in the offset angle estimate at STEP 906. As currently designed, the QAH method produces differences in the offset angle estimates very slowly. A TALA flag is set and the TALA estimates are saved at STEP 914. The QAH method described above with reference to FIG. 7 eventually generates an estimate of the boresight offset angle at STEP 904. If a change in the offset angle is produced by the QAH method, a QAH flag is set at STEP 906.

The combination method proceeds to STEP 908 to determine if both the QAH and TALA flags are set. If not, the method returns to STEP 900. However, if both flags are set, the method triggers the TALA method to process the saved values, and to discard those estimates having large differences from the mean. The method proceeds to STEP 916 where the five most recently obtained TALA estimates are averaged. Alternatively, the method may average more or less recently obtained TALA estimates at STEP 916. The result of the discarding and averaging operations is compared to the QAH estimate at STEP 918. As described above, if the QAH and TALA estimates agree within a minimum threshold value (referred to as "Minimum$_{TH}$" in FIG. 9), their average will be used as the new boresight correction result. Therefore, at STEP 918, the QAH and processed TALA estimates are compared to Minimum$_{TH}$. In one preferred embodiment, the value of Minimum$_{TH}$ is 0.3 degrees, though other values are possible. If the difference between the QAH and TALA estimates exceeds Minimum$_{TH}$, the method proceeds to STEP 926 whereat the QAH and TALA flags are reset and the method starts over again at STEP 900. However, if the difference between the QAH and TALA estimates is less than Minimum$_{TH}$, the method proceeds to STEP 920.

At STEP 920, the value of "result" is set to the average of the QAH and TALA estimates. Other alternatives for generating a "result" value based upon the QAH and TALA estimates are possible. For example, as described above, a weighted average of the estimates can be made whereby the QAH or the TALA-produced estimates are given more weight. After the result is obtained at STEP 920, the result is compared with pre-determined minimum and maximum threshold values at STEP 922. As described above, if the result is less than a pre-determined minimum threshold value (Min$_{TH}$), it does not warrant a boresight correction and the new result will not be applied to the boresight azimuth. Similarly, if the result exceeds a pre-determined maximum threshold value (Max$_{TH}$), the result is too unreliable and will not be used to correct the boresight azimuth angle. Therefore, at STEP 922 the result obtained at STEP 920 is compared to Min$_{TH}$ and Max$_{TH}$, and if it does not fall within these threshold values the method proceeds to STEP 926, resets the flags, and starts the combination method again at STEP 900.

However, if the result falls within these threshold values, the result is used for the boresight correction value at STEP 924. If there are any azimuth averages being accumulated by the TALA method they are cleared (discarded) at STEP 924. The QAH histogram is also reinitialized at STEP 924 (all bins are cleared to zero except the bin corresponding to zero degrees). The method then proceeds to STEP 926 whereat both flags are reset. The method then returns to STEP 900 whereat the azimuth correction is performed using the correction value produced at STEP 920.

If the conditions necessary to generate a new "correction" value are not met the processing continues without any changes being made to the boresight azimuth angle. In the rare instances when the TALA method has not produced an update since the last QAH estimate change, or when the TALA method produces a value that does not compare to QAH, rather than wait for the next QAH change (which could, in some cases, take several hours), the very next TALA update should be used. The comparison of the TALA and QAH estimates is continued until there is an agreement between the estimates.

In summary, the invention includes a method and apparatus for calibrating azimuth boresight in a radar system. The present invention is particularly useful in automobiles, trucks, vans, or any other vehicle that travels on a road with other vehicles. The present invention reduces system size and costs by not requiring the use of additional equipment for boresight calibration purposes. The present invention advantageously uses relatively simple and straight-forward algorithms for calculating a boresight offset angle. The calibration techniques described above may be used independently, or concurrently (as shown in FIG. 9), to accurately calibrate azimuth boresight.

A number of embodiments of the present invention have been described. Nevertheless, it will be understood that various modifications may be made without departing from the spirit and scope of the invention. For example, the present invention may use any FCC-approved vehicle radar frequency and bandwidth. As described above, the present invention preferably uses a monopulse radar system using at least two transmitting frequencies. However, the present invention is not so limited. The invention contemplates use of any radar which can obtain the range, R, range rate, and boresight azimuth angle, β, of a target. For example, switched beam, frequency scanned, or mechanically scanned radar systems may be employed.

Accordingly, it is to be understood that the invention is not to be limited by the specific illustrated embodiment, but only by the scope of the appended claims.

What is claimed is:

1. A method of calibrating a boresight of a radar antenna in a radar system, comprising the steps of:
   a) selecting a calibration target for use in calibrating the antenna boresight;
   b) obtaining an initial measurement of the target range and azimuth angle at a first time instance;
   c) obtaining a subsequent measurement of the target range and azimuth angle at a second time instance;
   d) calculating a boresight offset angle α using the initial and subsequent target range and azimuth angle measurements; and
   e) calibrating the antenna boresight to compensate for the boresight offset angle calculated in step (d).

2. The method of calibrating an antenna boresight of claim 1, wherein the calibration targets are selected in step (a) based upon pre-determined criteria necessary to qualify a target for calibration purposes.

3. The method of calibrating an antenna boresight of claim 2, wherein the qualifying criteria include a minimum target range for the selected target.

4. The method of calibrating an antenna boresight of claim 2, wherein the qualifying criteria include a minimum reflected signal magnitude for the target.

5. The method of calibrating an antenna boresight of claim 1, wherein the boresight offset angle α is calculated in accordance with the following equation:

$$\alpha = \frac{\gamma_{n+1}\beta_{n+1} - \beta_n}{1 - \gamma_{n+1}};$$

wherein $$\gamma_{n+1} = \frac{R_{n+1}}{R_n},$$

and wherein $\beta_{n+1}$ comprises the target azimuth angle obtained during the second time instance;

$\beta_n$ comprises the target azimuth angle obtained during the first time instance;

$R_{n+1}$ comprises the target range obtained during the second time instance; and $R_n$ comprises the target range obtained during the first time instance.

6. The method of calibrating an antenna boresight of claim 1, wherein the calibrating step (e) comprises physically moving the radar antenna an angular distance equal to the boresight offset angle calculated in step (d).

7. The method of calibrating an antenna boresight of claim 1, wherein the calibrating step (e) comprises mathematically compensating for the boresight offset angle calculated in step (d).

8. The method of claim 7, wherein the calibrating step (e) comprises adding the boresight offset angle calculated in step (d) to all target azimuth angles detected by the radar system.

9. A method of calibrating a boresight of a radar antenna in a radar system, comprising the steps of:
   a) selecting a calibration target for use in calibrating the antenna boresight;
   b) obtaining an initial measurement of the selected calibration target's range and azimuth angle at a first time instance;
   c) obtaining subsequent measurements of the selected calibration target's range and azimuth angle at successive time instances subsequent to the first time instance;
   d) calculating a boresight offset angle α using the initial and subsequent target range and azimuth angle measurements; and
   e) calibrating the antenna boresight to compensate for the boresight offset angle calculated in step (d).

10. The method of claim 9, wherein the boresight offset angle is calculated in step (d) by calculating interim boresight offset angles at each successive time instance of step (c), summing the interim boresight offset angles together, and finding the average of the interim boresight offset angles by dividing the sum by the number of successive time instances.

11. The method of claim 10, wherein the interim boresight offset angles a at each time instance i is computed in accordance with the following equation:

$$\alpha_i = \frac{\gamma_i(\beta_{n+1})_i - \beta_n}{1 - \gamma_i}; \quad \gamma_i = \frac{(R_{n+1})_i}{R_n},$$

and wherein i comprises integrals ranging from 1 to the total number of time successive instances used in step (c).

12. A method of calibrating a boresight of a radar antenna in a vehicular radar system, wherein the radar system is deployed on a host vehicle, and wherein the host vehicle travels upon a road and has a known heading, comprising the steps of:
   a) selecting a qualified calibration target vehicle that is substantially aligned with the host vehicle's heading for use in calibrating the antenna boresight;
   b) obtaining an initial measurement of the calibration target azimuth angle at a first time instance;
   c) obtaining a subsequent measurement of the calibration target azimuth angle at a second time instance;
   d) estimating a boresight offset angle α based upon the initial and subsequent calibration target azimuth angle measurements; and
   e) calibrating the antenna boresight to compensate for the boresight offset angle calculated in step (d).

13. The method of calibrating an antenna boresight of claim 12, wherein the boresight offset angle α is estimated by averaging the calibration target azimuth angle obtained during steps (b) and (c).

14. A method of calibrating a boresight of a radar antenna in a vehicular radar system, wherein the radar system is deployed on a host vehicle, and wherein the host vehicle travels upon a road and has a known heading, comprising the steps of:
   a) selecting a qualified calibration target vehicle that is substantially aligned with the host vehicle's heading for use in calibrating the antenna boresight;
   b) obtaining an initial measurement of the calibration target azimuth angle at a first time instance;
   c) obtaining subsequent measurements of the calibration target azimuth angle at successive time instances subsequent to the first time instance;
   d) estimating a boresight offset angle α based upon the initial and subsequent calibration target azimuth angle measurements; and
   e) calibrating the antenna boresight to compensate for the boresight offset angle estimated in step (d).

15. The method of claim 14, wherein step (c) comprises obtaining N subsequent measurements at N successive time instances subsequent to the first instance.

16. The method of claim 15, further comprising the step of determining an absolute value of a difference between the calibration target azimuth angles measured at N and N-1 successive time instances, and abandoning the calibration method whenever the absolute value of the difference exceeds a pre-defined safety threshold.

17. The method of claim 16, wherein the safety threshold is approximately 0.5 degrees.

18. The method of claim 14, wherein the estimating step (d) comprises averaging the initial and subsequent calibration target azimuth angle measurements.

19. The method of claim 14, wherein a calibration target is selected in step (a) based upon predetermined criteria necessary to qualify a target for calibration purposes.

20. The method of claim 19, wherein the criteria necessary to qualify a target for calibration purposes includes a requirement that the target be within a pre-determined detection range of the antenna.

21. The method of claim 19, wherein the criteria necessary to qualify a target for calibration purposes includes a requirement that the target has a non-zero velocity relative to the host vehicle.

22. The method of claim 21, wherein the non-zero velocity relative to the host vehicle falls within a pre-determined velocity range.

23. The method of claim 19, wherein the criteria necessary to qualify a target for calibration purposes includes a requirement that signals reflected back to the antenna from the target have a magnitude that exceeds a pre-determined signal strength threshold.

24. The method of claim 14, wherein adjacent vehicle traffic is suppressed from being erroneously selected in step (a) as a qualified calibration target by imposing pr-determined restrictions upon the selection of a target in order to qualify the target for calibration purposes.

25. The method of claim 24, wherein the pre-determined restrictions include the requirement that the target meet minimum thresholds for signal magnitude, radar-cross-section, and signal-to-noise ratio.

26. The method of claim 24, wherein the pre-determined restrictions include the requirement that the target and the host vehicle are loosely speed-matched.

27. The method of claim 24, wherein the pre-determined restrictions include the requirement that the host vehicle have a velocity exceeding a pre-determined threshold.

28. The method of claim 24, wherein the pre-determined restrictions include the requirement that the host vehicle have a turn rate below a pre-determined threshold.

29. The method of claim 28, wherein the host vehicle turn rate threshold is approximately ½ degree/second.

30. An apparatus for calibrating an antenna boresight in a radar system, comprising:
   a) means for selecting a calibration target for use in calibrating the antenna boresight;
   b) means, responsive to the selecting means, for obtaining an initial measurement of the target range and azimuth angle at a first time instance;
   c) means, responsive to the selecting means, for obtaining subsequent measurements of the target range and azimuth angle at successive time instances subsequent to the first time instance;
   d) means, responsive to the obtaining means, for calculating a boresight offset angle α using the initial and subsequent target range and azimuth angle measurements; and
   e) means, for calibrating the antenna boresight to compensate for the calculated boresight offset angle.

31. The calibration apparatus of claim 30, wherein the means for obtaining target range and azimuth angle measurements comprises a radar system.

32. The calibration apparatus of claim 31, wherein the radar system comprises a monopulse radar system.

33. An apparatus for calibrating a boresight of a radar antenna for use in a vehicular radar system, wherein the radar system is deployed on a host vehicle, and wherein the host vehicle travels upon a road and has a known heading, comprising:
   a) means for selecting a qualified calibration target that is substantially aligned with the host vehicle's heading for use in calibrating the antenna boresight;
   b) means, responsive to the selecting means, for obtaining an initial measurement of the calibration target azimuth angle at a first time instance;
   c) means, responsive to the selecting means, for obtaining subsequent measurements of the calibration target azimuth angle at successive time instances subsequent to the first time instance;
   d) means, responsive to the obtaining means, for estimating a boresight offset angle α based upon the initial and subsequent calibration target azimuth angle measurements; and
   e) means, for calibrating the antenna boresight to compensate for the estimated boresight offset angle.

34. The calibration apparatus of claim 33, wherein the means for obtaining azimuth angle measurements comprises a radar system.

35. The calibration apparatus of claim 34, wherein the radar system comprises a monopulse radar system.

36. A computer program executable on a general purpose computing device, wherein the program is capable of calibrating a boresight of a radar antenna in a radar system, comprising:
   a) a first set of instructions for selecting a calibration target for use in calibrating the antenna boresight;
   b) a second set of instructions for obtaining an initial measurement of the calibration target's range and azimuth angle at a first time instance;

c) a third set of instructions for obtaining subsequent measurements of the calibration target's range and azimuth angle at successive time instances subsequent to the first time instance;

d) a fourth set of instructions for calculating a boresight offset angle α using the initial and subsequent target range and azimuth angle measurements; and e) a fifth set of instructions for calibrating the antenna boresight to compensate for the calculated boresight offset angle.

37. The computer program of claim 36, wherein the program is executed by a general purpose computing device in the radar system.

38. The computer program of claim 36, wherein the program is executed by a field programmable gate array device.

39. A method of calibrating a boresight of a radar antenna in a vehicular radar system, wherein the radar system is deployed on a host vehicle, and wherein the radar system is capable of obtaining target azimuth angle measurements from targets detected by the radar antenna, and wherein the radar system maintains an azimuth angle 5 histogram, the histogram having a plurality of bins associated and corresponding to a set of discrete target azimuth angles, comprising the steps of:

a) initializing an azimuth histogram such that each azimuth angle bin is set to zero, except that a bin associated with a zero degree target azimuth angle is set to a pre-determined maximum histogram count;

b) receiving target data and obtaining a target azimuth angle measurement;

c) qualifying the azimuth angle measurement obtained at step (b);

d) if the azimuth angle measurement qualifies, adding a count to the target azimuth angle bin corresponding to the qualified azimuth angle measurement;

e) determining whether the histogram contains a pre-determined maximum number of counts;

f) returning to step (b) if the histogram does not contain the maximum number of counts, otherwise, determining the antenna boresight offset angle from the azimuth angle bin having the highest number of counts; and g) calibrating the antenna boresight using the boresight offset angle determined in step (f).

* * * * *